US012679038B2

(12) United States Patent
Elford et al.

(10) Patent No.: US 12,679,038 B2
(45) Date of Patent: Jul. 14, 2026

(54) SYSTEM AND METHOD FOR ASSESSING THE ABILITY TO REMOVE LOOSE POWDER FROM AN ADDITIVELY MANUFACTURABLE ARTICLE

(71) Applicant: The Boeing Company, Arlington, VA (US)

(72) Inventors: Michael C. Elford, Springfield (AU); Andrew J. Stephan, Brisbane (AU)

(73) Assignee: The Boeing Company, Arlington, VA (US)

( * ) Notice: Subject to any disclaimer, the term of this patent is extended or adjusted under 35 U.S.C. 154(b) by 414 days.

(21) Appl. No.: 18/454,024

(22) Filed: Aug. 22, 2023

(65) Prior Publication Data

US 2025/0065569 A1 Feb. 27, 2025

(51) Int. Cl.
| | |
|---|---|
| *B29C 64/393* | (2017.01) |
| *B33Y 50/02* | (2015.01) |
| *G06N 7/01* | (2023.01) |

(52) U.S. Cl.
CPC ............ *B29C 64/393* (2017.08); *B33Y 50/02* (2014.12); *G06N 7/01* (2023.01)

(58) Field of Classification Search
CPC ....... B29C 64/393; B33Y 50/02; B33Y 40/20; B33Y 50/00; B33Y 10/00; B33Y 30/00; G06N 7/01; B22F 3/1115; B22F 5/10; B22F 10/28; B22F 10/68; B22F 10/80; B22F 12/70; B22F 12/90; G06F 2113/10; G06F 2119/18; G06F 30/20
See application file for complete search history.

(56) References Cited

U.S. PATENT DOCUMENTS

2022/0347923 A1* 11/2022 Hartmann ............. B29C 64/153

FOREIGN PATENT DOCUMENTS

DE 102021205570 A1 * 12/2022 ............... B08B 5/04

OTHER PUBLICATIONS

Ameen et al. "Design the support structures for easy removal of un-melted powder in metal additive manufacturing" from "International Journal of Advanced Science and Technology vol. 29, No. 02, (2020), pp. 1847-1854" (Year: 2020).*

(Continued)

*Primary Examiner* — Yuhui R Pan

(57) ABSTRACT

A method of assessing the ability to remove powder from an additively manufacturable article includes performing the following for each of a plurality of discrete starting points distributed within a sampling volume: calculating the starting point directional trajectory lengths of a plurality of trajectories of a particle starting from the starting point and moving in an initial direction respectively along a plurality of combinations of a polar angle $\phi$ and an azimuthal angle $\theta$ of a spherical coordinate system about the starting point, and calculating an average of the starting point directional trajectory lengths to give a starting point average trajectory length for the starting point. The method also includes calculating an average of the starting point average trajectory lengths respectively of the plurality of starting points to give a global average trajectory length for the article.

20 Claims, 19 Drawing Sheets

(56)　　　　　References Cited

OTHER PUBLICATIONS

Hunter et al. "Assessment of trapped powder removal and inspection strategies for powder bed fusion techniques" from "The International Journal of Advanced Manufacturing Technology (2020) 106:4521-4532" (Year: 2020).*

Carré et al. "A method to determine the depowdered height in lattices manufactured by electron beam melting" from "Journal of Manufacturing Processes 34 (2018) 1-6" (Year: 2018).*

Roberts "Modelling of Powder Removal for Additive Manufacture Postprocessing" from "J. Manuf. Mater. Process. 2021, 5, 86") (Year: 2021).*

Roberts et al., "Modelling of Powder Removal for Additive Manufacture Postprocessing," Journal of Manufacturing and Materials Processing, Published Aug. 6, 2021.

Hunter et al. "Assessment of trapped powder removal and inspection strategies for powder bed fusion techniques," The International Journal of Advanced Manufacturing Technology, Published Jan. 22, 2020.

EPO, Extended European Search Report, Appl. No. 24192210.3, issued Jan. 13, 2025.

Carre Aurelien et al., "A method to determine the depowdered height in lattices manufactured by electron beam melting", Journal of Manufacturing Processes, Society of Manufacturing Engineers, Dearborn, MI, US, vol. 34, May 30, 2018, pp. 1-6.

Verma Saurav et al., "CFD and strength analysis of novel biomimetic lattice structure designed for additive manufacturing and postprocessing", Materials & Design, Elsevier, Amsterdam, NL, vol. 224, Nov. 12, 2022.

* cited by examiner

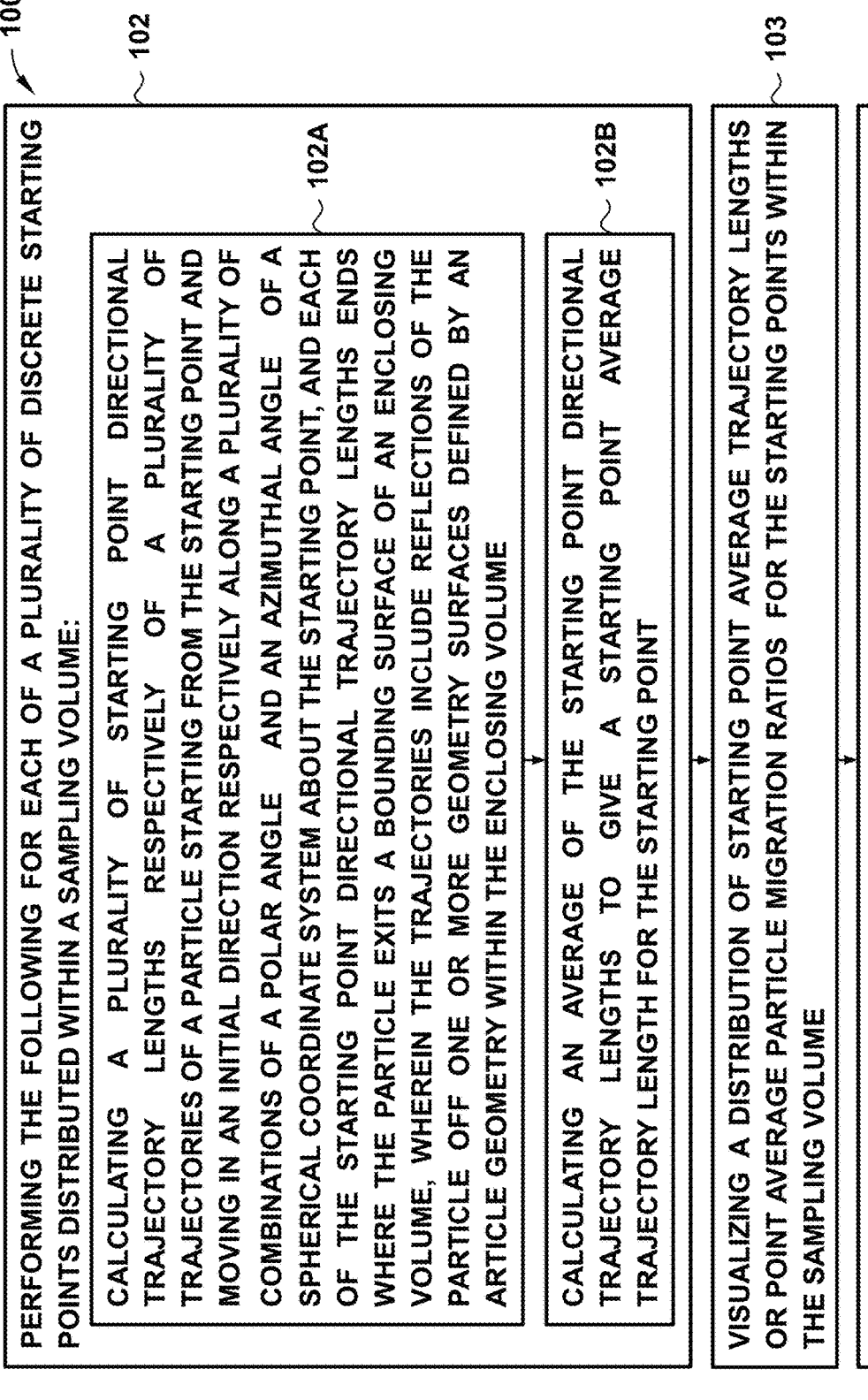

100

PERFORMING THE FOLLOWING FOR EACH OF A PLURALITY OF DISCRETE STARTING POINTS DISTRIBUTED WITHIN A SAMPLING VOLUME:

102

CALCULATING A PLURALITY OF STARTING POINT DIRECTIONAL TRAJECTORY LENGTHS RESPECTIVELY OF A PLURALITY OF TRAJECTORIES OF A PARTICLE STARTING FROM THE STARTING POINT AND MOVING IN AN INITIAL DIRECTION RESPECTIVELY ALONG A PLURALITY OF COMBINATIONS OF A POLAR ANGLE AND AN AZIMUTHAL ANGLE OF A SPHERICAL COORDINATE SYSTEM ABOUT THE STARTING POINT, AND EACH OF THE STARTING POINT DIRECTIONAL TRAJECTORY LENGTHS ENDS WHERE THE PARTICLE EXITS A BOUNDING SURFACE OF AN ENCLOSING VOLUME, WHEREIN THE TRAJECTORIES INCLUDE REFLECTIONS OF THE PARTICLE OFF ONE OR MORE GEOMETRY SURFACES DEFINED BY AN ARTICLE GEOMETRY WITHIN THE ENCLOSING VOLUME

102A

CALCULATING AN AVERAGE OF THE STARTING POINT DIRECTIONAL TRAJECTORY LENGTHS TO GIVE A STARTING POINT AVERAGE TRAJECTORY LENGTH FOR THE STARTING POINT

102B

VISUALIZING A DISTRIBUTION OF STARTING POINT AVERAGE TRAJECTORY LENGTHS OR POINT AVERAGE PARTICLE MIGRATION RATIOS FOR THE STARTING POINTS WITHIN THE SAMPLING VOLUME

103

CALCULATING AN AVERAGE OF THE STARTING POINT AVERAGE TRAJECTORY LENGTHS RESPECTIVELY OF THE PLURALITY OF STARTING POINTS TO GIVE A GLOBAL AVERAGE TRAJECTORY LENGTH FOR THE ARTICLE

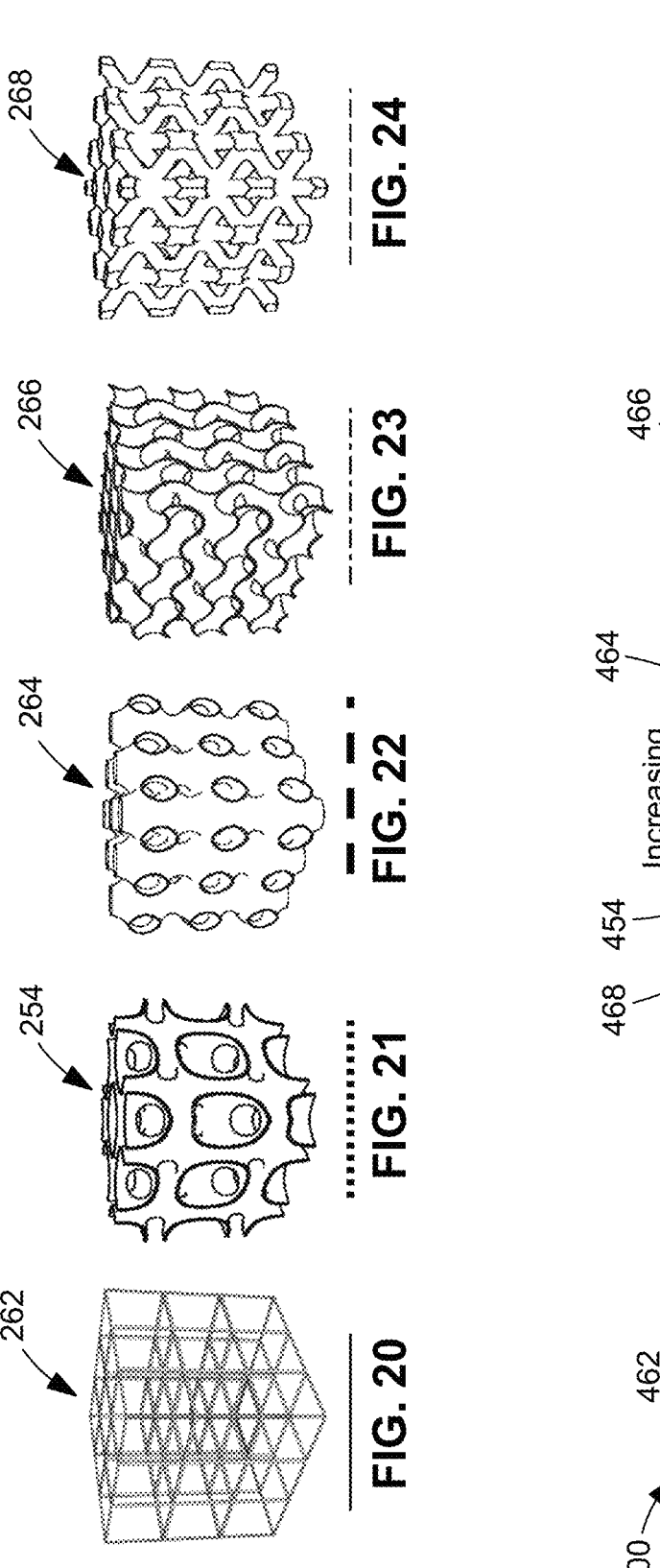
FIG. 20
FIG. 21
FIG. 22
FIG. 23
FIG. 24
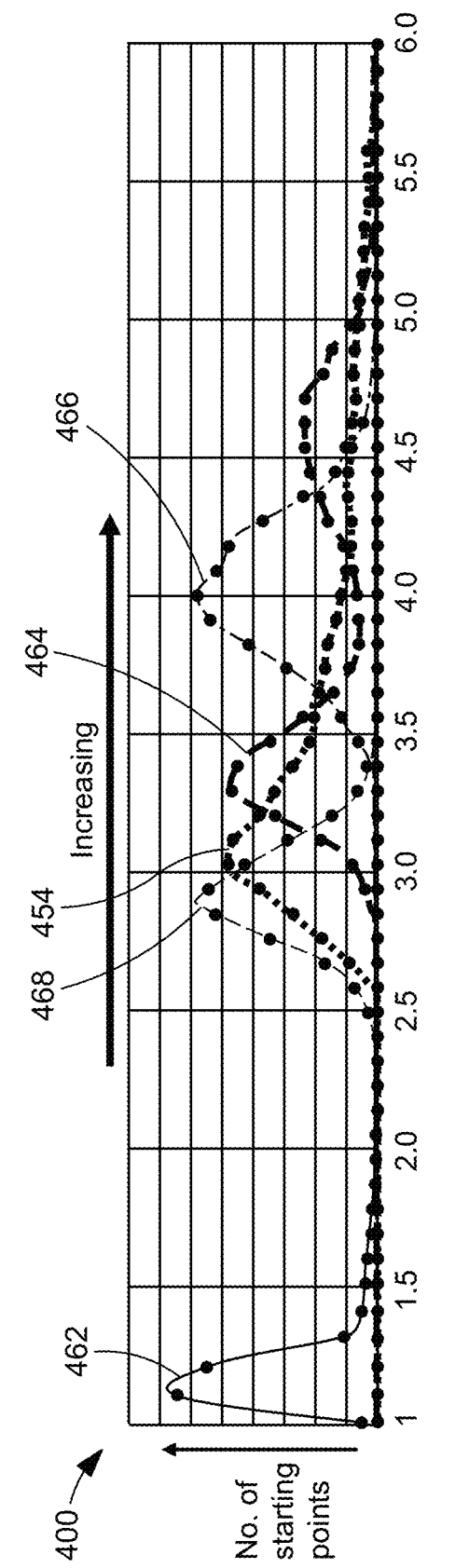
FIG. 19

SYSTEM AND METHOD FOR ASSESSING THE ABILITY TO REMOVE LOOSE POWDER FROM AN ADDITIVELY MANUFACTURABLE ARTICLE

FIELD

The present disclosure relates generally to additive manufacturing and, more particularly, to a system and method for assessing the ability to remove loose powder from an additively manufacturable article.

BACKGROUND

Additive manufacturing is a process of manufacturing an article via the successive application and solidification of layers of material on top of each other. For example, powder bed fusion is a type of additive manufacturing in which metal powder is fused in a layer-by-layer fashion in order to build up an article, such as a sandwich panel. A sandwich panel is a structure having a pair of face sheets interconnected by an infill geometry. The infill geometry can be comprised of a repeating pattern of unit cells, resulting in a lightweight panel having a relatively high bending stiffness.

The infill geometry of an additively manufactured article can present challenges in removing loose powder at the completion of the additive manufacturing build process. For example, the unit cells that make up the infill geometry of a sandwich panel can have a unit cell geometry that entraps loose powder or inhibits its removal. Loose powder remaining inside an additively manufactured article can be problematic for economic and/or environmental reasons. For example, the inability to recover and recycle unused powder from additively manufactured articles can increase the cost of a production program.

When designing an additively manufacturable article, the ability to remove powder can be a significant factor in selecting which unit cell geometry to use for the infill geometry. Unfortunately, part designers currently have limited means for assessing and comparing different unit cell geometries for powder removability.

As can be seen, there exists a need in the art for a system and method of assessing the ability to remove loose powder from an additively manufactured article at the completion of the build process.

SUMMARY

The above-noted needs associated with assessing the ability to remove loose powder from an additively manufactured article are addressed by the present disclosure, which provides a method for assessing powder removability from an article. The method includes performing the following for each of a plurality of discrete starting points distributed within a sampling volume: calculating a plurality of starting point directional trajectory lengths respectively of a plurality of trajectories of a particle starting from the starting point and moving in an initial direction respectively along a plurality of combinations of a polar angle $\phi$ and an azimuthal angle $\theta$ of a spherical coordinate system about the starting point, and each of the starting point directional trajectory lengths ends where the particle exits a bounding surface of an enclosing volume, and the trajectories include reflections of the particle off one or more geometry surfaces defined by an article geometry within the enclosing volume. The method additionally includes performing the following for each of the starting points: calculating an average of the starting point directional trajectory lengths to give a starting point average trajectory length for the starting point. The method also includes calculating an average of the starting point average trajectory lengths respectively of the plurality of starting points to give a global average trajectory length for the article.

Also disclosed is a method of assessing the ability to remove powder from an infill geometry of an additively manufacturable article. The method includes performing the following for each of a plurality of discrete starting points distributed within one of a plurality of interconnected unit cells that form the infill geometry of the article: calculating a plurality of starting point directional trajectory lengths respectively of a plurality of trajectories of a particle starting from the starting point and moving in an initial direction respectively along a plurality of combinations of a polar angle $\phi$ and an azimuthal angle $\theta$ of a spherical coordinate system about the starting point, and each of the starting point directional trajectory lengths ends where the particle exits a sphere within the infill geometry. The sphere encompasses the unit cell that contains the plurality of starting points and has a radius equivalent to the length of a body diagonal of the cube. The trajectories include reflections of the particle off one or more geometry surfaces defined by the infill geometry. The method additionally includes performing the following for each of the starting points: calculating an average of the starting point directional trajectory lengths for the starting point, and dividing the average by the body diagonal to give a point average particle migration ratio for the starting point. The method also includes calculating an average of the point average particle migration ratios respectively of the plurality of starting points to give a global average particle migration ratio for the infill geometry.

Additionally disclosed is a processor-based system for assessing the ability to remove powder from an additively manufacturable article. The processor-based system includes a memory device configured to store an article geometry of the article comprised of a plurality of interconnected unit cells each fitting exactly within a cube and having a common unit cell geometry. The processor-based system also includes a particle migration distance calculator configured to perform the following for each of a plurality of discrete starting points distributed within a sampling volume: calculating a plurality of starting point directional trajectory lengths respectively of a plurality of trajectories of a particle starting from the starting point and moving in an initial direction respectively along a plurality of combinations of a polar angle $\phi$ and an azimuthal angle $\theta$ of a spherical coordinate system about the starting point, and calculating an average of the starting point directional trajectory lengths to give a starting point average trajectory length for the starting point. The particle migration distance calculator is also configured to calculate an average of the starting point average trajectory lengths respectively of the plurality of starting points to give a global average trajectory length for the article.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description, taken in conjunction with the accompanying drawings, which illustrate preferred and exemplary versions, but which are not necessarily drawn to scale. The drawings are examples, and are not meant as limitations on the description or the claims.

FIG. 1 is a flowchart of an example of a method of assessing the ability to remove powder from an additively manufacturable article;

FIG. 19 shows an example of a histogram plot of the histograms of the point average particle migration ratios respectively of different unit cell geometries;

FIG. 20 shows an example of a cubic frame unit cell for which the point average particle migration ratios are shown in the histogram of FIG. 19;

FIG. 21 shows an example of a connectable cuboid unit cell for which the point average particle migration ratios are shown in the histogram of FIG. 19;

FIG. 22 shows an example of a Schwarz-P unit cell for which the point average particle migration ratios are shown in the histogram of FIG. 19;

FIG. 23 shows an example of a gyroid unit cell for which the point average particle migration ratios are shown in the histogram of FIG. 19;

FIG. 24 shows an example of a body-centered-cubic unit cell for which the point average particle migration ratios are shown in the histogram of FIG. 19;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed examples are shown. Indeed, several different examples or versions may be provided and should not be construed as limited to the examples set forth herein. Rather, these examples are provided so that this disclosure will be thorough and fully convey the scope of the disclosure to those skilled in the art.

This specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to"

perform a task or tasks. In such contexts, "configured to" is used to connote structure by indicating that the parts or components include structure that performs those task or tasks during operation. As such, the parts or components can be said to be configured to perform the task even when the specified part or component is not currently included.

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 4:
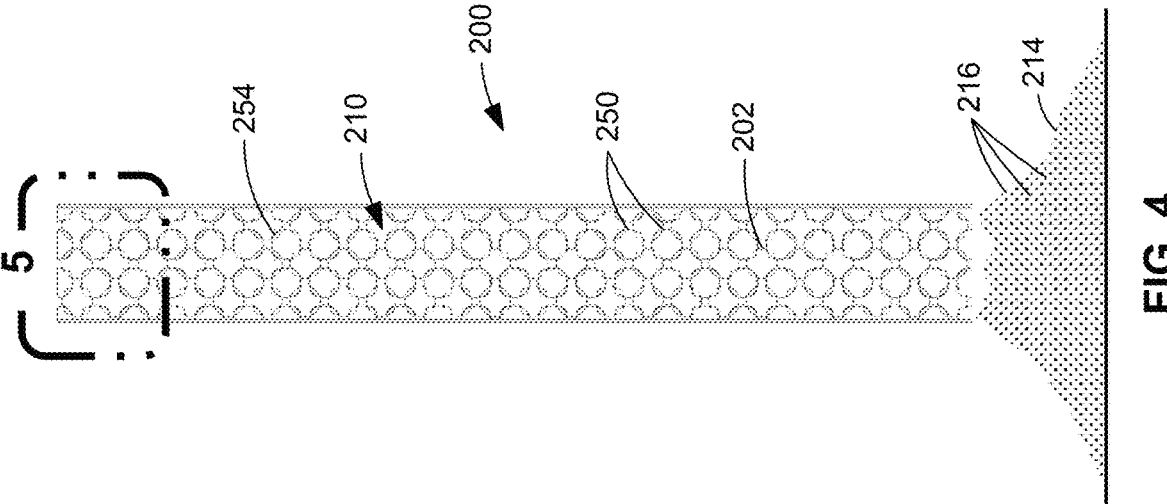
FIG. 4 is a sectional side view of the sandwich panel of FIG. 2 illustrating loose powder after removal from the infill geometry.

Referring now to the drawings, shown in FIG. 1 is a flowchart of an example of a method 100 of assessing the ability to remove powder 214 (FIG. 4) from an additively manufacturable article 200 (FIG. 4). As mentioned above, loose powder 214 can remain within the article geometry 202 (FIG. 4) at the completion of the additive manufacturing build process. The article geometry 202 includes the unit cells 250 (FIG. 4) that make up the infill geometry 210 (FIG. 4) of the article 200. The presently disclosed method 100 provides a means for assessing the relative ease with which the article geometry 202 allows powder 214 particles 216 (FIG. 4) to traverse the unit cells 250 and exit the article 200 when the article 200 is subjected to random agitation or vibration, such as via a shaker (not shown) or other device configured to shake or vibrate the article 200 for removing loose powder 214.

Figure 2:
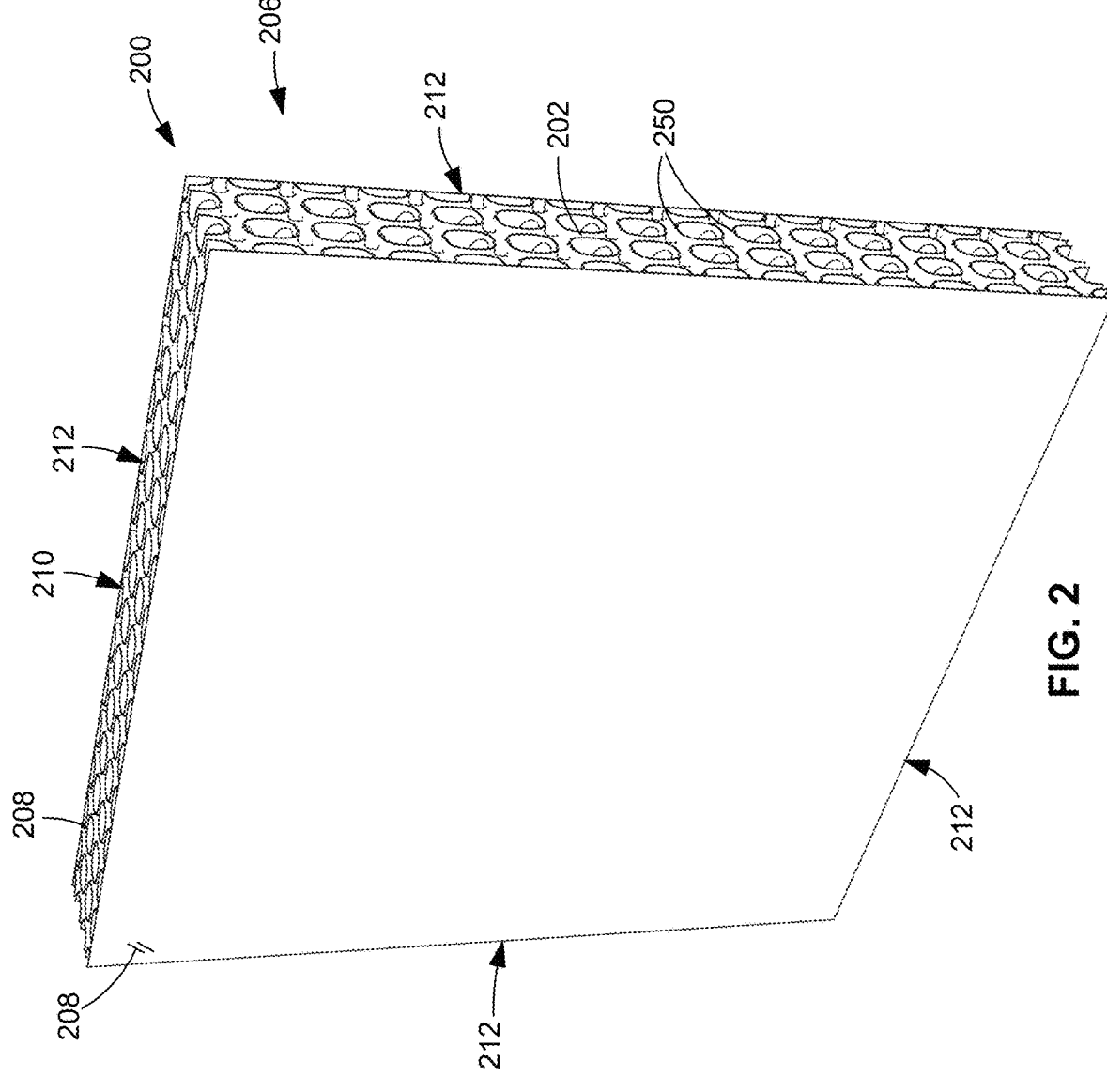
FIG. 2 is a perspective view of an example of an additively manufactured article configured as a sandwich panel having a pair of face sheets interconnected by an infill geometry (i.e., an article geometry) comprised of a repeating pattern of unit cells.

Referring to FIGS. 2-6, the method 100 is described in the context of a planar, constant-thickness sandwich panel 206. The article geometry 202 of the sandwich panel 206 comprises a pair of face sheets 208, and an infill geometry 210 which interconnects the face sheets 208 as shown in FIG. 2. The sandwich panel 206 can be produced using any suitable additive manufacturing technique where powder 214 is the additive material. For example, the sandwich panel 206 can be produced using the above-mentioned powder bed fusion process which involves the layer-by-layer fusing of metal particles 216 using a laser beam or an electron beam. However, the method 100 is applicable for assessing the removability of powder 214 from an article 200 produced using powder as a feedstock.

Figure 3:
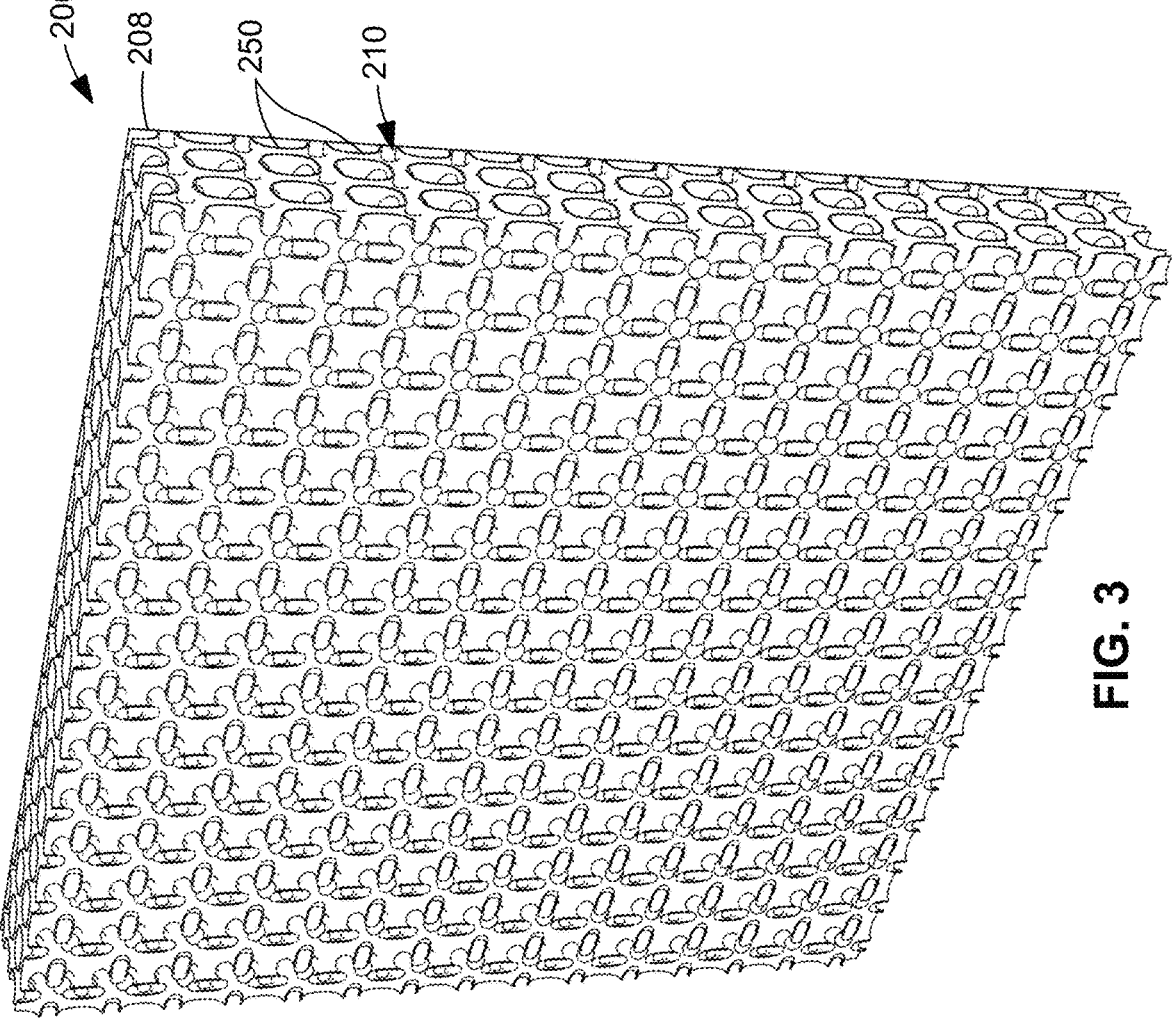
FIG. 3 is a cutaway view of the sandwich panel of FIG. 2 with one of the face sheets omitted to illustrate the repeating unit cells that make up the infill geometry.
Figure 5:
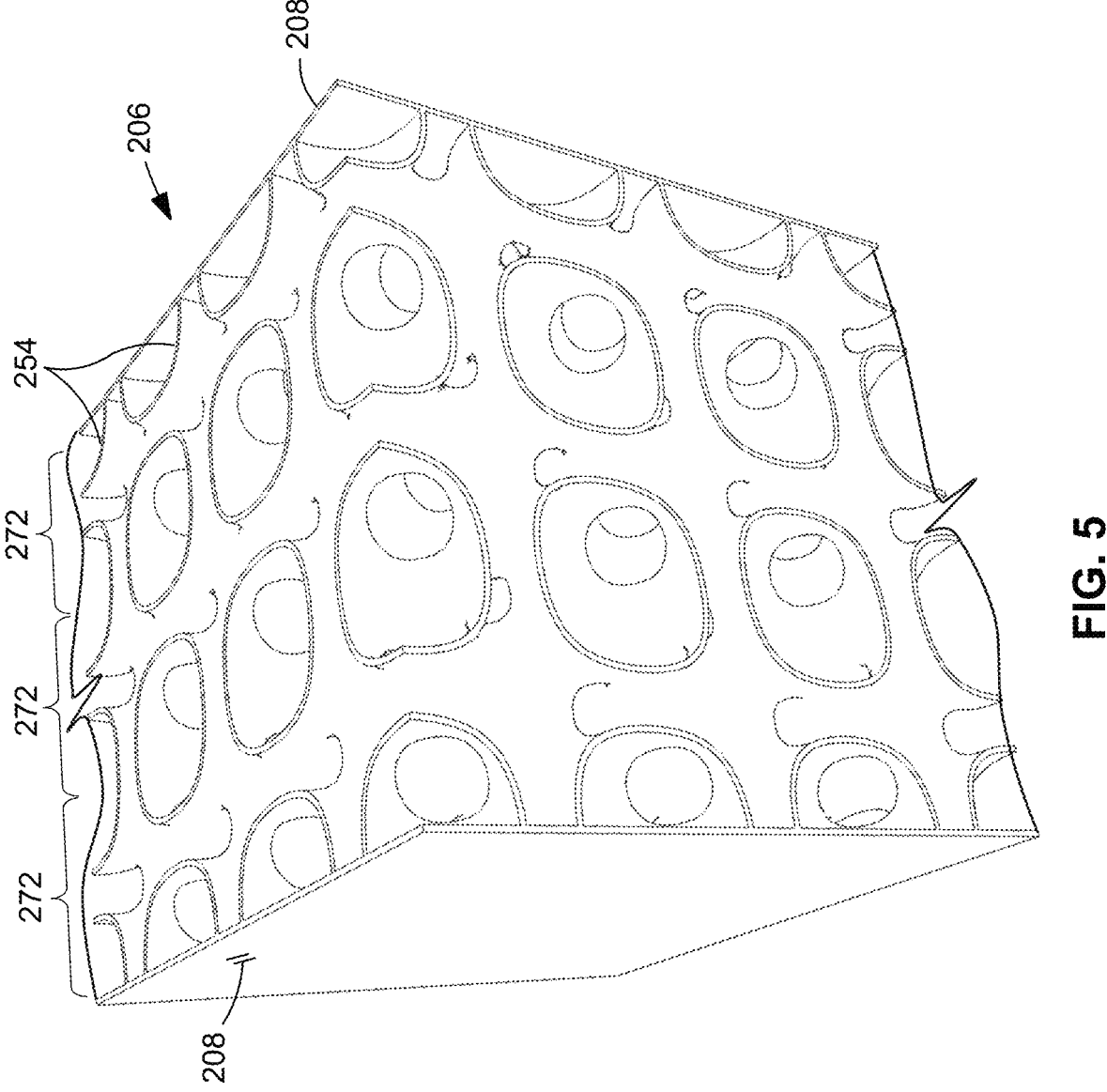
FIG. 5 is a magnified view of the portion of the sandwich panel of FIG. 2 identified by reference numeral 5 and illustrating an example of the unit cells configured as connectable cuboids in a multi-layer arrangement.
Figure 6:
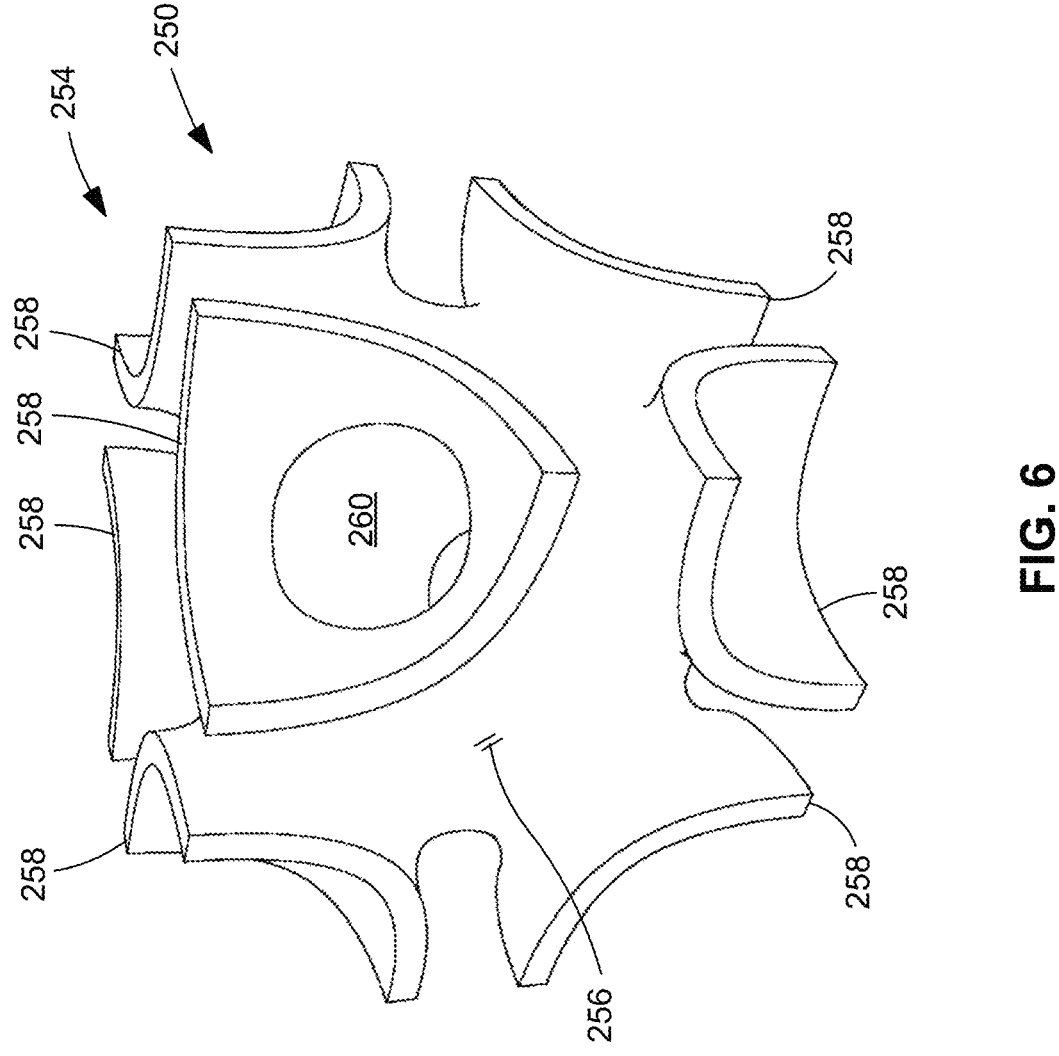
FIG. 6 is a perspective view of an example of a connectable cuboid configuration of a unit cell.

In FIGS. 2-6, the infill geometry 210 is comprised of a repeating pattern of unit cells 250. FIG. 3 is a cutaway view of the sandwich panel 206 with one of the face sheets 208 omitted to illustrate the repeating pattern of unit cells 250 that make up the infill geometry 210. FIG. 4 is a sectional side view of the sandwich panel 206 illustrating loose powder 214 at the base of the sandwich panel 206 after removal from the infill geometry 210. Each unit cell 250 (FIG. 6) of the infill geometry 210 is configured as a connectable cuboid 254 (FIG. 6). FIG. 5 shows a portion of the sandwich panel 206 of FIG. 4 illustrating the repeating pattern of connectable cuboids 254 in a multi-layer arrangement. In the example shown, the infill geometry 210 is comprised of 3 layers 272 of connectable cuboids 254 stacked on top of each other. A pair of face sheets 208 are located on opposite sides of the multi-layer arrangement of connectable cuboids 254.

FIG. 6 shows an example of a single connectable cuboid 254. The connectable cuboid 254 comprises a hollow three-dimensional center portion 256 and 8 corner portions 258. The center portion 256 is closed except for 8 openings 260. The 8 corner portions 258 are coupled to the center portion 256 respectively at the 8 openings 260. Each corner portion has a rounded shape and a concave side that faces away from the center portion 256. The connectable cuboid 254 has symmetries (e.g., is triply periodic) enabling the corner portions 258 to be interconnected to the corner portions 258 of adjacent connectable cuboids 254.

Although described in the context of the sandwich panel 206 of FIGS. 2-6, the presently disclosed method 100 is applicable to a three-dimensional object of any shape, size, or configuration, and is not limited to sandwich panels 206. For example, the method 100 is applicable to any one of a variety of sandwich panel configurations not shown, including non-planar sandwich panels, variable-thickness sandwich panels, sandwich panels having a single layer of unit cells 250 or two or more layers of unit cells 250, or to three-dimensional objects having a single face sheet 208, or three-dimensional objects that are devoid of face sheets 208. As mentioned above, the presently disclosed method 100 provides a means for assessing and comparing different unit cell geometries 252 for powder removability. The method 100 is also described in the context of comparing the powder removability of a connectable cuboid 254 unit cell geometry 252 to the powder removability of alternative unit cell geometries 252, such as those illustrated in FIGS. 20-24 and described below.

Figures 7, 8:
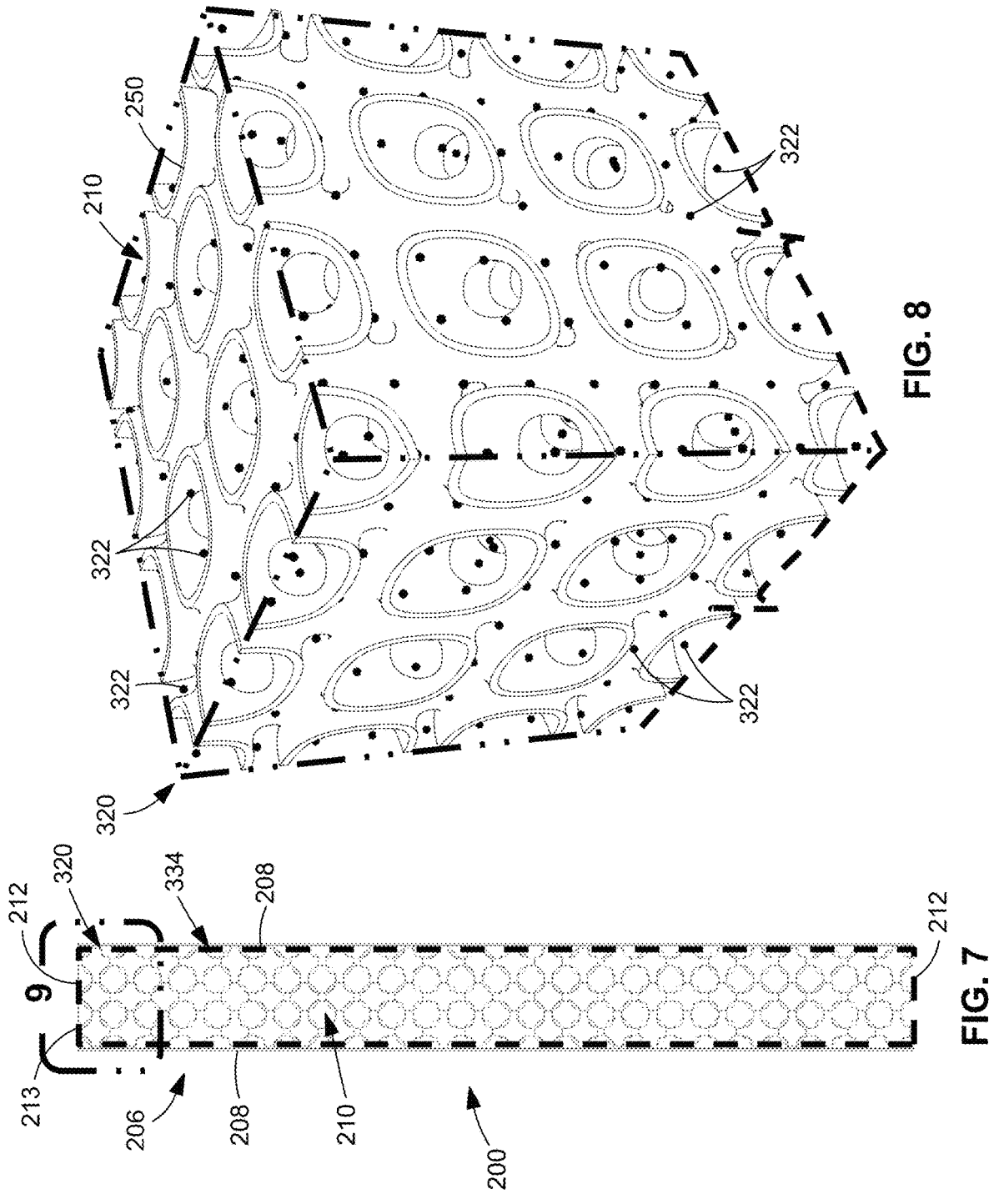
FIG. 7 is an end view of the sandwich panel of FIG. 2 illustrating a sampling volume defined by the inner surfaces of the face sheets and the outer faces of a bounding box of the infill geometry of the sandwich panel.
FIG. 8 is a magnified view of the portion of the sandwich panel of FIG. 7, with the face sheets omitted and illustrating a plurality of discrete starting points for a dimensionless and weightless particle, and wherein the starting points are uniformly distributed within the sampling volume.

Referring to the flow chart of FIG. 1 with additional reference to FIGS. 7-10, step 102 of the method 100 comprises performing step 102A and step 102B for each of a plurality of discrete starting points 322 uniformly distributed within a sampling volume 320. For example, FIGS. 7-8 show a plurality of starting points 322 uniformly distributed within a sampling volume 320 enclosed by the 2 face sheets 208 (FIG. 7) of the sandwich panel 206 (FIG. 7) and the 4 side faces (i.e., the outer faces 213 of bounding box 212) of the sandwich panel 206 as shown in FIGS. 3 and 7.

Step 102A comprises calculating a plurality of starting point directional trajectory lengths respectively of a plurality of trajectories 328 (FIGS. 9-10) of a particle 216 (FIGS. 9-10) starting from the starting point 322 (FIGS. 9-10) and moving in an initial direction 324 (FIG. 10) respectively along a plurality of combinations of a polar angle $\phi$ and an azimuthal angle $\theta$ of a spherical coordinate system 326 (FIG. 10) about the starting point 322. The particle 216 is massless and dimensionless. Movement of the particle 216 from each starting point 322 is analogous to the tracing of a ray of light starting from the starting point 322. In this regard, the method 100 comprises simulating the trajectories 328 of a particle 216 starting from a plurality of different starting points 322, and moving in an initial trajectory 328 from each starting point 322 in different combinations of the polar angle $\phi$ and the azimuthal angle $\theta$. As shown in FIG. 10, the azimuthal angle $\theta$ is measured relative to the x-axis and within the x-y plane of the spherical coordinate system 326. The polar angle $\phi$ is measured relative to the z-axis of the spherical coordinate system 326. The orientation of the spherical coordinate system 326 is irrelevant provided it is defined consistently.

Figure 9:
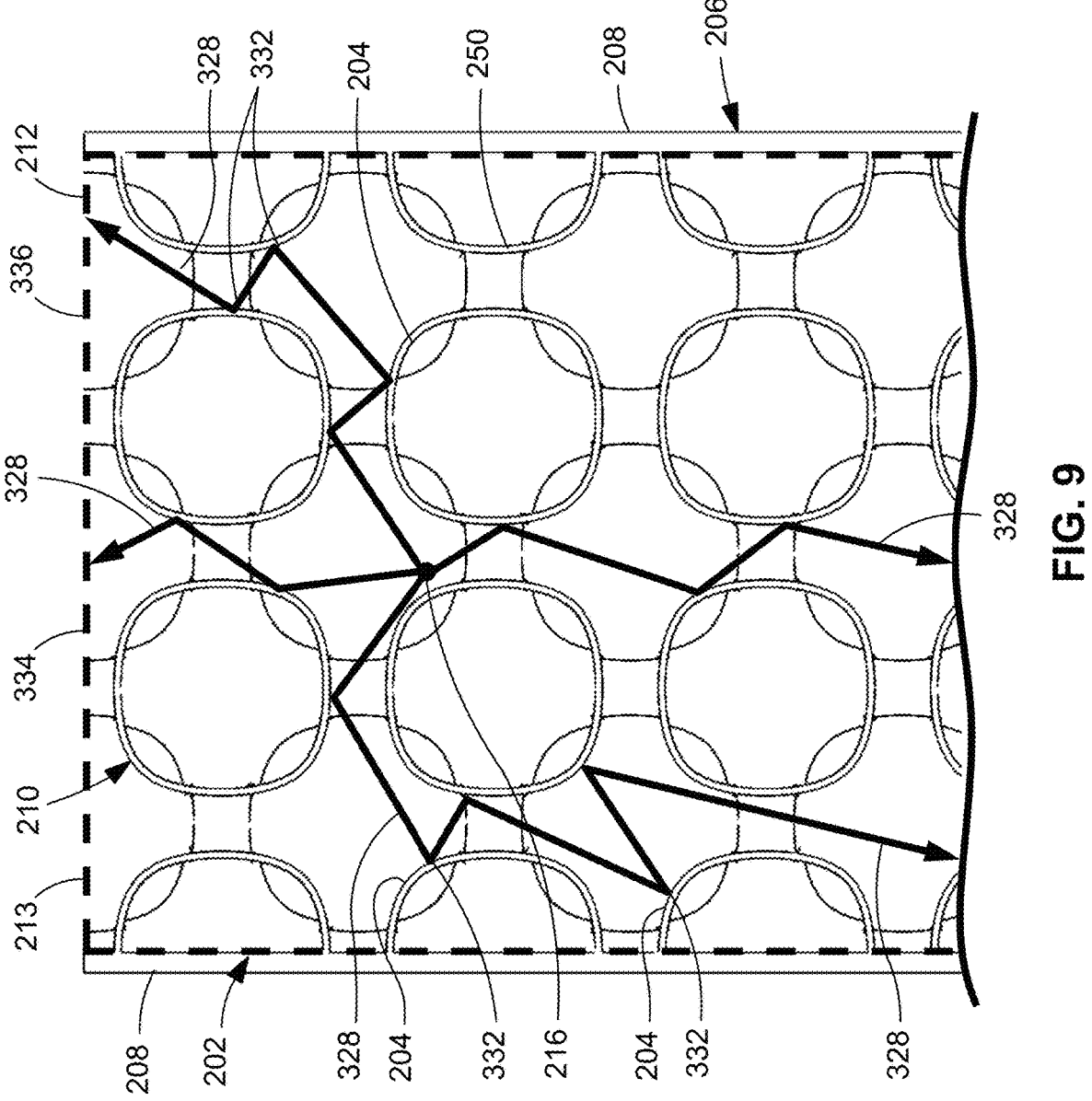
FIG. 9 is an end view of the portion of the sandwich panel of FIG. 7 illustrating several different trajectories of a particle starting from one of the starting points and reflecting off one or more geometry surfaces prior to the particle exiting the enclosing volume.
Figure 10:
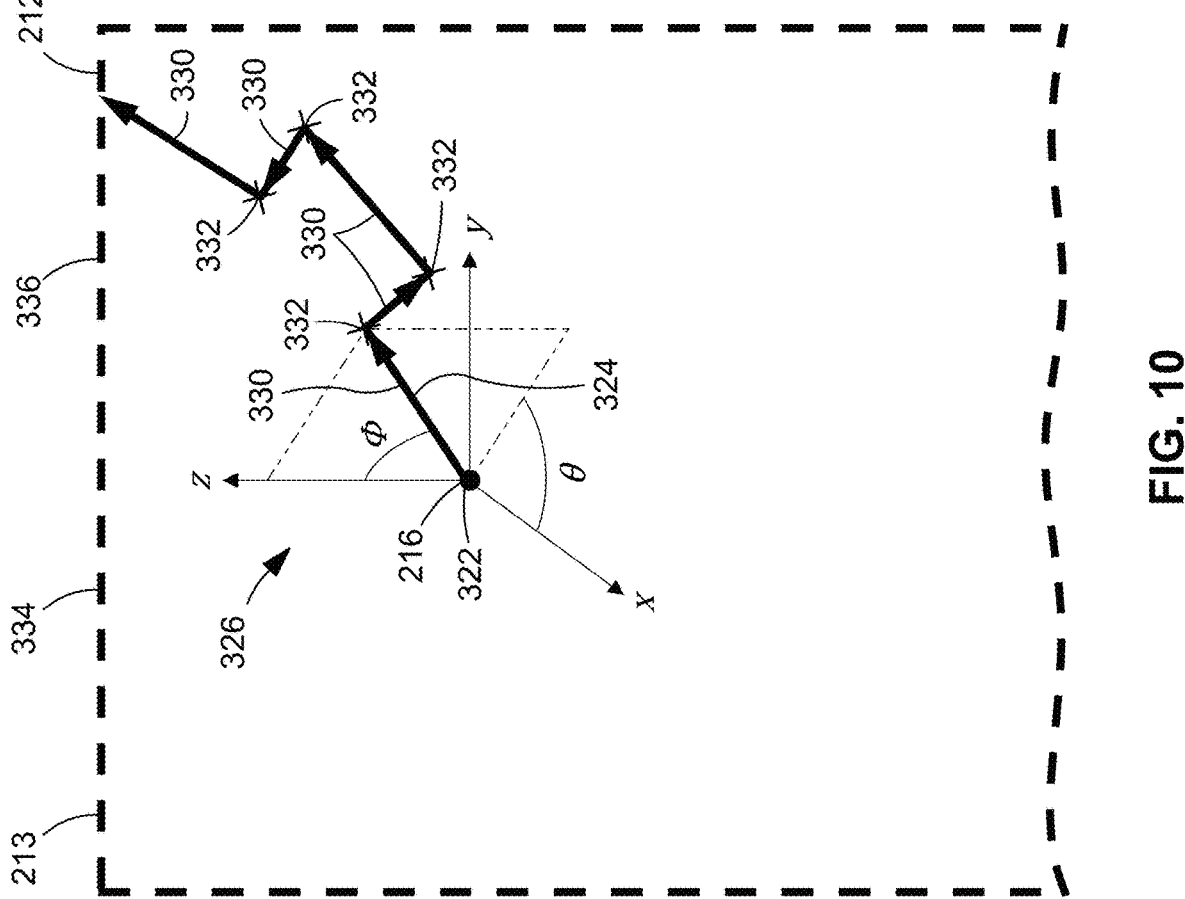
FIG. 10 shows one of the trajectories of FIG. 9 comprised of a plurality of trajectory segments resulting from the reflection of the particle off the geometry surfaces of the infill geometry after starting from the starting point and moving in an initial direction along a combination of a polar angle and an azimuthal angle of a spherical coordinate system about the starting point.

FIG. 9 shows several of multiple different trajectories 328 of a particle 216 starting from one of the starting points 322 of FIG. 8. At least some of the trajectories 328 include reflections of the particle 216 off one or more geometry surfaces 204 (i.e., at the reflection points 332) defined by an article geometry 202 within the enclosing volume 334. For example, FIG. 9 shows the particle 216 reflecting (i.e., at reflection points 332—FIGS. 9 and 10) off the cell walls of the unit cells 250 that make up the infill geometry 210 of the sandwich panel 206. Although not shown, the particles 216 can also reflect off the face sheets 208 of the sandwich panel 206. Each of the starting point directional trajectory lengths ends where the particle 216 exits a bounding surface 336 of an enclosing volume 334. For example, in FIG. 9, the end of each starting point directional trajectory length is the location where the particle 216 exits the infill geometry 210 at the outer faces 213 (e.g., side faces) of the bounding box 212, which is superimposed on the sandwich panel 206. In this regard, FIGS. 7-9 illustrate an example of the method 100 in which the sampling volume 320 and the enclosing volume 334 are the same region, which is the region bounded by the outer faces 213 (e.g., side faces) of the article 200 (e.g., the sandwich panel 206). As shown in FIGS. 2, 4, and 5, the outer faces 213 (e.g., side faces) of the sandwich panel 206 are open.

In the example of FIGS. 9-10, each starting point directional trajectory length contains a plurality of trajectory segments 330. All of the trajectory segments 330 are linear and, aside from the initial trajectory segment 330, result from the reflection of the particle 216 off the geometry surfaces 204 (e.g., the cell walls) of the unit cells 250 of the infill geometry 210. Although not shown in the present example, it is possible that at least one trajectory 328 of the particle 216 from at least one starting point 322 will not reflect off the article geometry 202, and instead will travel from the starting point 322 directly out of the enclosing volume 334, which would result in the starting point directional trajectory length containing exactly one trajectory segment 330. Regardless of the number of trajectory segments 330 in each starting point directional trajectory length, step 102A of calculating the starting point directional trajectory length respectively of the plurality of trajectories 328 of a particle 216 starting from each starting point 322 comprises summing up the lengths respectively of the plurality of trajectory segments 330 respectively of the trajectories 328 from that starting point 322.

It should be noted that it is possible to encounter a geometric scenario in which a starting point directional trajectory length is infinite, in which case step 102A includes bounding the starting point directional trajectory length in order to prevent an infinite loop. This can be achieved, for example, by imposing an upper bound on the starting point directional trajectory length, the upper bound being taken as the starting point directional trajectory length in instances where this length is exceeded. Alternatively, a maximum number of reflections may be specified. Examples of geometric scenarios where a starting point directional trajectory length is infinite include: (1) the article geometry 202 has closed regions (not shown) from which powder 214 can never escape, and (2) the article geometry 202 results in trajectories (not shown) which periodically return to the position and direction of some previous starting point 322 of a trajectory segment 330 without crossing a bounding surface 336 of the enclosing volume 334 (i.e., a periodic orbit in a dynamical system sense).

For each starting point 322 within the sampling volume 320, step 102B of the method 100 comprises calculating an average of the starting point directional trajectory lengths to give a starting point average trajectory length for the starting point 322. A variety of different techniques can be used to calculate the starting point average trajectory length. For example, the starting point average trajectory length can be calculated by analytically evaluating a definite integral of the plurality of starting point directional trajectory lengths across a space defined by all possible combinations of the polar angle $\phi$ (e.g., from 0 to 180 degrees) and the azimuthal angle $\theta$ (e.g., from 0 to 360 degrees). In another example, the starting point average trajectory length can be calculated by estimating a value of the definite integral of the plurality of starting point directional trajectory lengths across the space defined by all possible combinations of the polar angle $\phi$ and the azimuthal angle $\theta$ using a numerical integration technique over the space. The numerical integration technique can include computing a Riemann sum, performing gauss point integration, using a trapezoidal rule, using Simpson's rule, or using any other suitable numerical integration technique. In a still further example, the starting point average trajectory length can be calculated by estimating the value of the definite integral of the plurality of starting point directional trajectory lengths across the space defined by all possible combinations of the polar angle $\phi$ and the azimuthal angle $\theta$ using a Monte Carlo technique.

Figures 11, 11A:
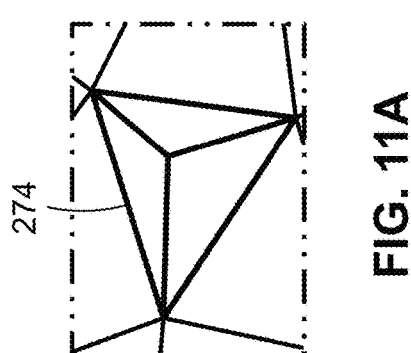
FIG. 11 shows an example of a portion of a domain defined by the set of all starting points contained within the sampling volume of the sandwich panel of FIGS. 7-8, minus the set of all starting points contained with the article geometry, and illustrating the domain after discretization into tetrahedral elements.
FIG. 11A is a magnified view of the portion of the domain identified by reference numeral 11A of FIG. 11, and illustrating one of the tetrahedral elements.

After calculating the starting point average trajectory length for each starting point 322 within the sampling volume 320, the method 100 includes step 104 which comprises calculating an average of the starting point average trajectory lengths respectively of the plurality of starting points 322 to give a global average trajectory length for the sampling volume 320. The global average trajectory length can be calculated using any one of a variety of techniques. In one example, the global average trajectory length can be calculated by analytically evaluating a definite integral across a domain defined by a set of all starting points 322 contained within the sampling volume 320, minus the set of all starting points 322 contained within the article geometry 202. In another example, the global average trajectory length can be calculated by estimating the value of the definite integral across the domain defined by the set of all starting points 322 contained within the sampling volume 320, minus the set of all starting points 322 contained within the article geometry 202, using a Monte Carlo technique. In a still further example, the global average trajectory length can be calculated by estimating the value of the definite integral across a domain defined by the set of all starting points 322 contained within the sampling volume 320, minus the set of all starting points 322 contained within the article geometry 202, by discretization of the domain into elements shaped as tetrahedrons (i.e., tetrahedral elements 274), and subsequent integration across the tetrahedral elements 274. FIG. 11 shows a portion of the above-described domain for the sandwich panel 206 of FIGS. 7-8 after discretization into tetrahedral elements 274. FIG. 11A is a magnified view of a portion of the domain of FIG. 11 showing one of the tetrahedral elements 274.

In one example of integrating across individual tetrahedral elements 274, the method 100 involves the use of basis functions. As known in the art, basis functions describe the value of a point of interest within a region using a weighted combination of values at points around the point of interest. In the example of FIG. 11, the point of interest within a tetrahedral element 274 is a starting point 322 (not shown). The points around the point of interest are the corner nodes (not shown) of the tetrahedral element 274. The method includes computing the volume coordinates (e.g., ($\zeta_1$, $\zeta_2$, $\zeta_3$, $\zeta_4$—not shown) at the point of interest, followed by computing basis functions at the starting point 322 using known techniques.

One example of an integration technique that can be used is gauss point integration, also referred to as gaussian quadrature, which involves approximating an integral by computing the value of the function that is being integrated over at a value, and then multiplying that value by a specific weight. The weighted values are then summed to get an approximation of the integral. One gauss point integration technique includes several schemes with different weighting factors, including the 1-point rule, the 4-point rule, the 5-point rule, and the 11-point rule. To illustrate an example of numerically integrating over the domain in FIG. 11 using the 5-point rule, the following would be performed for each tetrahedral element 274:

Compute the value of the starting point average trajectory length at the location $\zeta_1=\frac{1}{2}$, $\zeta_2=\frac{1}{6}$, $\zeta_3=\frac{1}{6}$ and $\zeta_4=\frac{1}{6}$ and save this as value $V_1$.

Compute the value of the starting point average trajectory length at the location $\zeta_1=\frac{1}{6}$, $\zeta_2=\frac{1}{2}$, $\zeta_3=\frac{1}{6}$ and $\zeta_4=\frac{1}{6}$ and save this as value $V_2$.

Compute the value of the starting point average trajectory length at the location $\zeta_1=\frac{1}{6}$, $\zeta_2=\frac{1}{6}$, $\zeta_3=\frac{1}{2}$ and $\zeta_4=\frac{1}{6}$ and save this as value $V_3$.

Compute the value of the starting point average trajectory length at the location $\zeta_1=\frac{1}{6}$, $\zeta_2=\frac{1}{6}$, $\zeta_3=\frac{1}{6}$ and $\zeta_4=\frac{1}{2}$ and save this as value $V_4$.

Compute the value of the starting point average trajectory length at the location $\zeta_1=\frac{1}{4}$, $\zeta_2=\frac{1}{4}$, $\zeta_3=\frac{1}{4}$ and $\zeta_4=\frac{1}{4}$ and save this as value $V_5$.

Compute the quantity $0.45(V_1+V_2+V_3+V_4)-0.8\ V_5$.

The resulting value approximates the integral of the starting point average trajectory length across one tetrahedral element 274 divided by the volume of that tetrahedral element 274. To get the integral itself, the value is multiplied by the volume of the tetrahedral element 274. However, because the starting point average trajectory length is the integral divided by the volume, it is not necessary to multiply the value by the volume of the tetrahedral element 274.

The global average trajectory length can be calculated for each of a plurality of different unit cell geometries 252 for an infill geometry 210 of the same size and shape, using the same number of starting points 322 uniformly distributed within the same sampling volume 320 enclosed by the face sheets 208 and the outer faces 213 (e.g., side faces) of the sandwich panel 206 of FIG. 7. For example, in addition to calculating the global average trajectory length for an infill geometry 210 (i.e., the sampling volume 320) comprised of connectable cuboids 254, the global average trajectory length can also be calculated for each unit cell geometry 252 shown in FIGS. 20-24, such as the cubic frame 262 (FIG. 20), the Schwarz-P 264 (FIG. 22), the gyroid 266 (FIG. 23), and the body-centered-cubic 268 (FIG. 24) configurations described below. The global average trajectory lengths respectively of the different unit cell geometries 252 can be compared to each other to determine the relative ease with which loose powder 214 can be removed from the infill geometry 210 of the sandwich panel 206 at the completion of an additive manufacturing build process. The comparison can be helpful to a designer in selecting which unit cell geometry 252 to use for the infill geometry 210.

Figure 12:
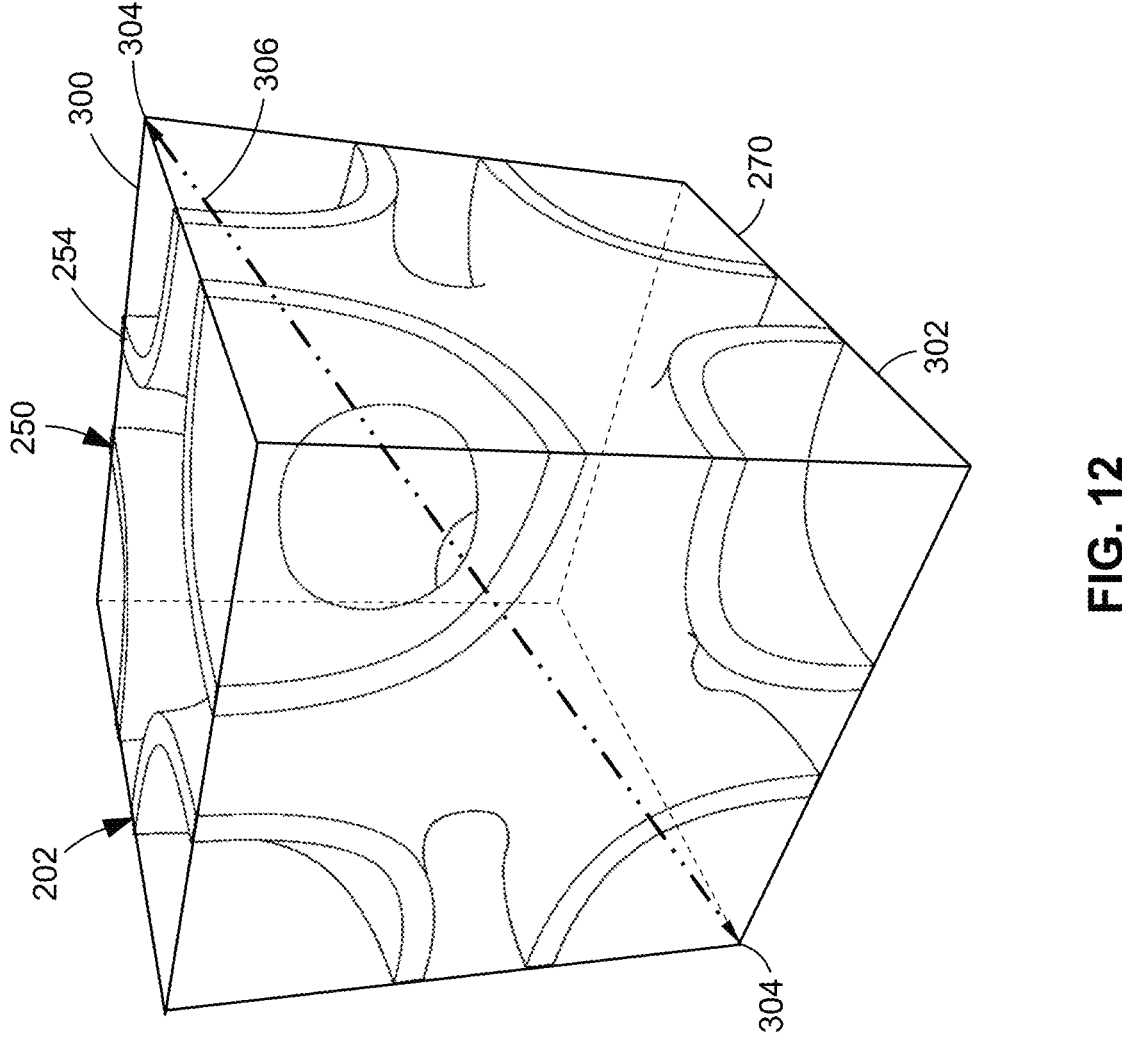
FIG. 12 is a perspective view of a connectable cuboid configuration of a unit cell having a cell side length, and which is contained exactly within a cube having cube side lengths equal to the cell side length.

In some examples, the method 100 can include normalizing the global average trajectory lengths by a prescribed distance to give a global average particle migration ratio. In the below described example in which the article geometry 202 is a single unit cell 250, the global average trajectory lengths can be divided by the radius of a sphere 338 (FIG. 14), wherein the radius is equivalent to a body diagonal 306 (FIG. 12) of a cube 300 (FIG. 12) exactly containing the unit cell 250, as shown in FIG. 12. The global average particle migration ratios respectively of different unit cell geometries 252 can be compared to each other to determine the relative case with which each unit cell geometry 252 allows powder 214 to traverse the unit cell geometry 252 and exit the infill geometry 210 of an article 200 comprised of unit cells 250.

As mentioned above, FIG. 12 shows a connectable cuboid 254 configuration of a unit cell 250 (FIG. 2), which is used in the following description of an example of the method 100 in which the article geometry 202 comprises a single unit cell 250 of a periodic unit cell pattern used in an additively manufacturable article 200. In the example of FIG. 12, the periodic unit cell 250 pattern forms the infill geometry 210 of the sandwich panel 206 of FIGS. 2-4 (i.e., the additively manufacturable article). As shown in FIG. 12, the connectable cuboid 254 unit cell 250 has a cell side length 270, and is contained exactly within a cube 300 having cube side lengths 302 that are equal to the cell side length 270.

In the below-described example of the method 100, the sampling volume 320 is the cube 300 of FIG. 13, which contains a plurality of uniformly distributed starting points 322. Also in the below-described example of the method 100, the enclosing volume 334 is a sphere 338, which is shown in FIG. 14 enclosing a portion of an infinitely repeating pattern of unit cells 252. The sphere 338 has a radius equal to the product of the cell side length 270 and the square root of three, which is the length of the body diagonal 306 (FIG. 12) that extends diagonally between opposite cube corners 304 (FIG. 12) of the cube 300. The location of the sphere 338 shifts for each starting point 322, such that the sphere 338 is centered on each starting point 322 when calculating the starting point directional trajectory lengths associated with the starting point 322. The size of the sphere 338 is such that regardless of which starting point 322 the sphere 338 is centered on, at least one full unit cell 250 will be contained within the sphere 338.

Figure 13:
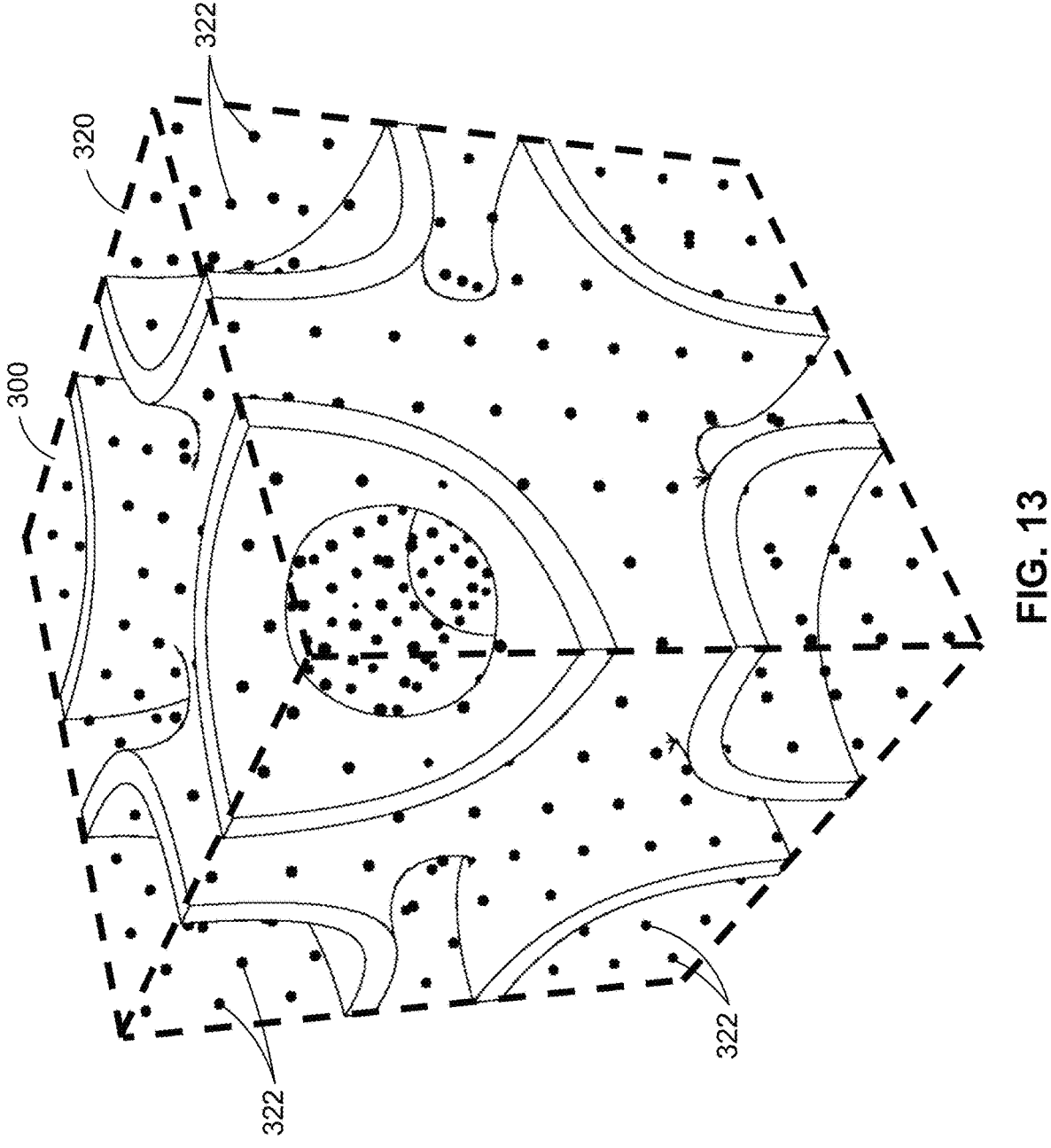
FIG. 13 shows an example of the sampling volume configured as a cube minus the volume occupied by the unit cell of FIG. 12, and which sampling volume is shown containing a plurality of uniformly distributed starting points.
Figure 14:
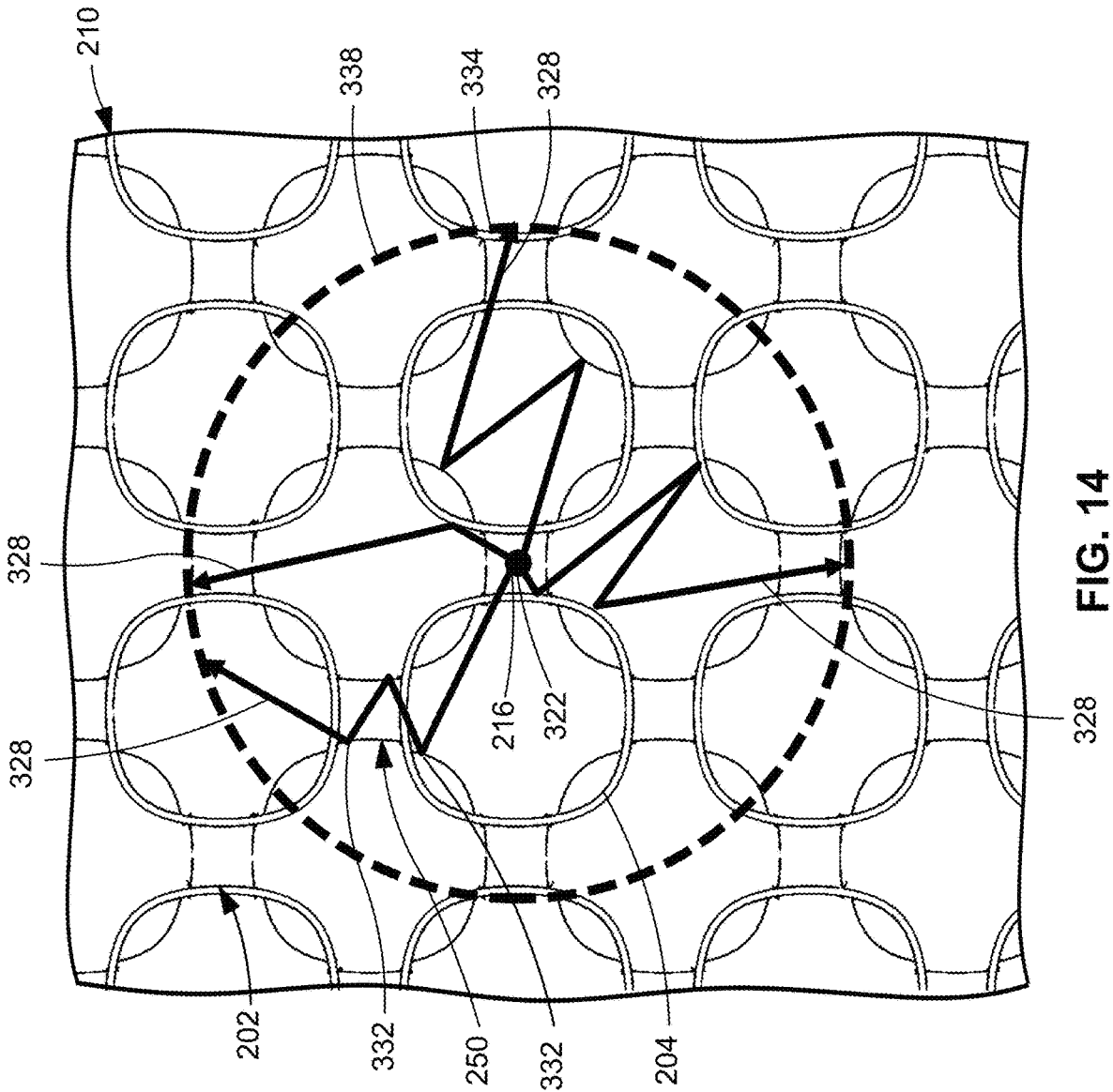
FIG. 14 shows an infinitely repeating pattern of unit cells and further illustrating the enclosing volume as a sphere, and also illustrating several different trajectories of a particle starting from one of the starting points within the sampling volume of the cube.
Figure 15:
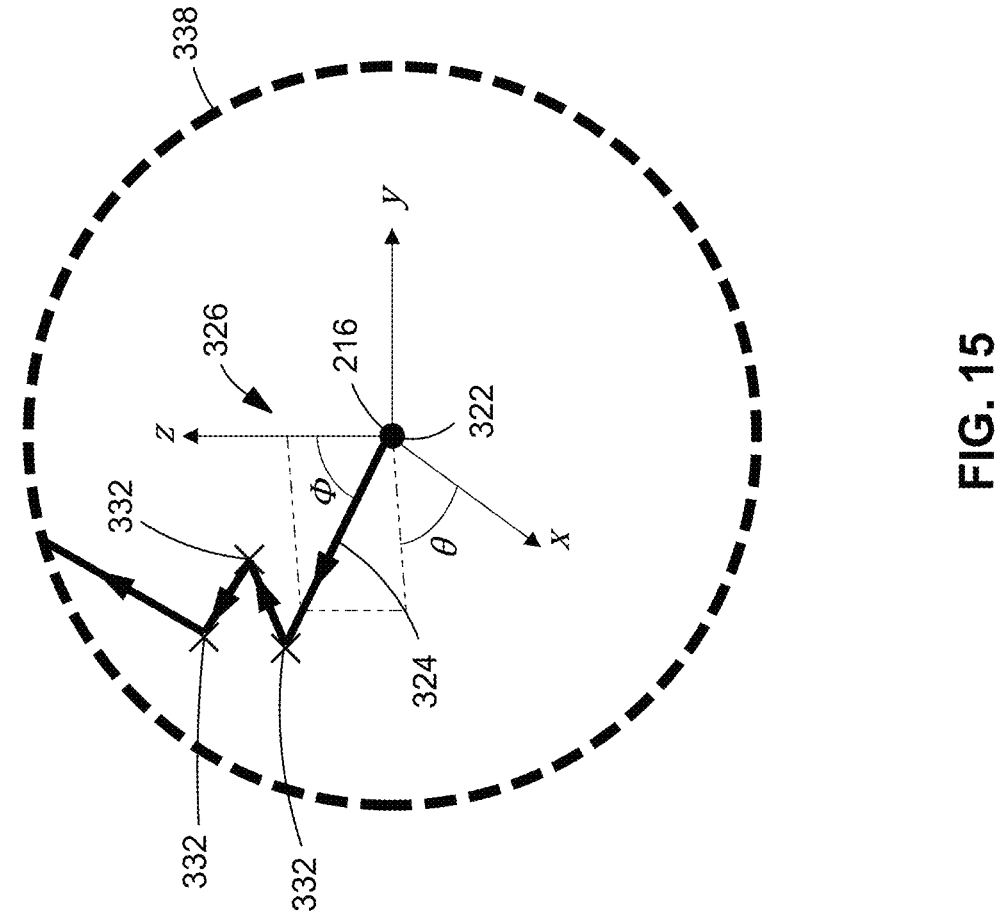
FIG. 15 shows one of the trajectories of FIG. 14 comprised of a plurality of trajectory segments resulting from the reflection of the particle off the geometry surfaces after starting from the starting point and moving in an initial direction along a polar angle and an azimuthal angle of the spherical coordinate system about the starting point.

FIGS. 14-15 show several of the plurality of trajectories 328 of a particle 216 starting from one of the starting points 322 within the sampling volume 320 (FIG. 13) of the cube 300 (FIG. 13). Similar to the trajectories 328 in the above-described example of FIG. 9, the trajectories 328 in FIGS. 14-15 include reflections (i.e., at the reflection points 332) off the cell walls of the unit cells 250 of the infill geometry 210. FIG. 15 shows one of the trajectories 328 of FIG. 14, the initial direction 324 of which is defined in terms of the polar angle $\phi$ and the azimuthal angle $\theta$ of the spherical coordinate system 326 about the starting point 322.

In performing step 102 of the method 100 for each of the starting points 322 in the sampling volume 320 (i.e., the cube 300) of FIG. 13, step 102A comprises calculating a plurality of starting point directional trajectory lengths respectively of the plurality of trajectories 328 of a particle 216 starting from the starting point 322 and moving in an initial direction 324 respectively along a plurality of combinations of the polar angle $\phi$ and the azimuthal angle $\theta$ of the spherical coordinate system 326 about the starting point 322, as shown in FIGS. 14-15. As mentioned above, the trajectories 328 include reflections of the particle 216 off the geometry surfaces 204 defined by the infill geometry 210, and each of the starting point directional trajectory lengths ends where the particle 216 exits the sphere 338 within the infill geometry 210. In step 102A, any one of the above-described techniques for calculating the starting point average trajectory length of a starting point 322 in the sampling volume 320 of FIG. 8 can be used for calculating the starting point average trajectory length of a starting point 322 in the sampling volume 320 of FIG. 13.

Step 102A can optionally include normalizing the starting point directional trajectory lengths for a given starting point 322 by a prescribed distance so as to define a starting point particle migration ratio. For the example of the single unit cell 250 of FIGS. 12-15, the prescribed distance by which all starting point directional trajectory lengths are normalized is the radius of the sphere 338, which is equivalent to the length of the body diagonal 306 of the cube 300. In this regard, the process of normalizing the starting point directional trajectory lengths comprises dividing the starting point directional trajectory lengths by the body diagonal 306 to give a directional point migration ratio for each starting point 322.

In performing step 102B for each starting point 322 in the sampling volume 320 (i.e., the cube 300) of FIG. 13, the method 100 includes calculating the average of the starting point directional trajectory lengths for the starting point 322 to give a starting point average trajectory length, and normalizing the starting point average trajectory length by the prescribed distance so as to define a point average particle migration ratio for the starting point 322. In the example of the single unit cell 250 of FIGS. 12-15, the process of normalizing comprises dividing the starting point average trajectory length by the radius of the sphere 338 (i.e., the body diagonal 306) to give a point average particle migration ratio for the starting point 322.

Figures 16, 17:
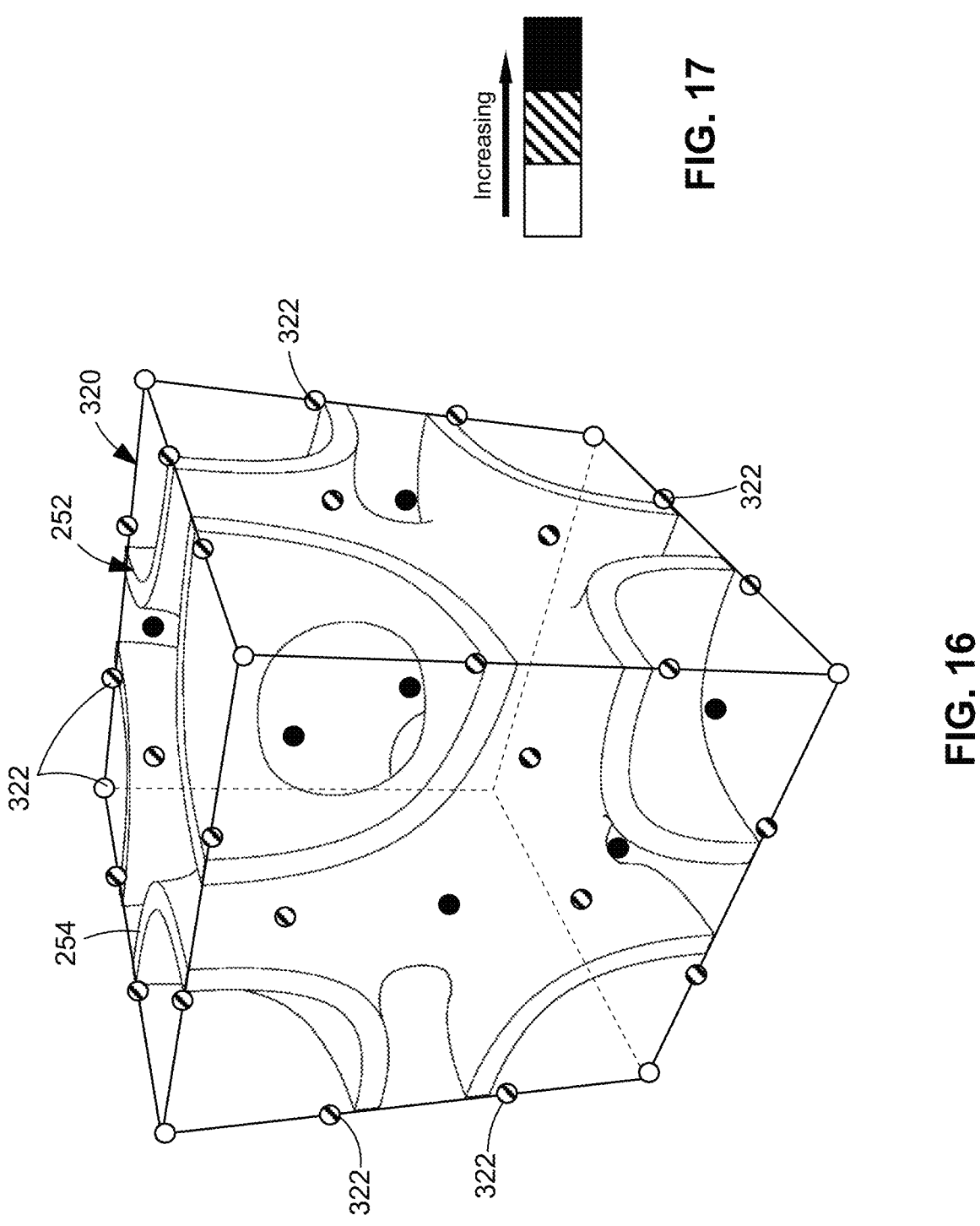
FIG. 16 is a perspective view of a connectable cuboid configuration of the unit cell, and further illustrating some of the starting points of FIG. 13 in a crosshatching style that corresponds to the value of the point average particle migration ratio of the starting point.
FIG. 17 is a legend for the corresponding crosshatching and the corresponding point average particle migration ratio of the starting points in the FIG. 16.

Referring to FIGS. 16-17, some examples of the method 100 can optionally include step 103 of generating and visualizing a distribution of starting point average trajectory lengths for all starting points 322 within a sampling volume 320 through one or more means. For example, step 103 can include generating a two-dimensional or three-dimensional heat map or similar representation showing the relative point average particle migration ratios of different starting point 322 locations within a unit cell geometry 252. For example, step 103 can include displaying at least a subset of the plurality of starting points 322 within a sampling volume 320 in a manner such that each starting point 322 has a designation (e.g., color coding, cross-hatching, etc.) that corresponds to a unique value of the point average particle migration ratio at that starting point 322, to thereby illustrate the spatial variation in the point average particle migration ratio across the enclosing volume 334, or a subset thereof. The different values of the point average particle migration ratios can be designated by color coding as mentioned above, or by other means such as by using different cross-hatching styles (e.g., FIG. 17), by number coding, or by other means.

For example, FIG. 16 is a three-dimensional view of a connectable cuboid 254 illustrating some of the starting points 322 of FIG. 13. The starting points 322 in FIG. 16 are crosshatched and/or shaded in a manner representing the relative value of the point average particle migration ratios of the starting points 322. FIG. 17 is a legend for the crosshatching and shading of the starting points 322 in FIG. 16. In FIG. 17, the white shading on the lefthand side of the legend designates a relatively low value of the point average particle migration ratio, the diagonal crosshatching in the center of the legend designates a relatively medium value of the point average particle migration ratio, and the black shading on the righthand side of the legend designates a relatively high value of the point average particle migration ratio. Starting points 322 that have white shading represent locations within the unit cell geometry 252 where loose powder 214 may be relatively easy or quick to remove from the additively manufactured article 200 when subjected to random agitation or vibration. In contrast, starting points 322 that have black shading represent locations within the unit cell geometry 252 where loose powder 214 may be difficult or take longer to remove from the additively manufactured article 200 when subjected to agitation or vibration. Starting points 322 that have diagonal crosshatching represent locations where the difficulty or average time required to remove loose powder 214 is somewhere between that for starting points 322 represented by white shading and black shading. In this manner, FIG. 16 provides a visual indication of the relative case with which powder 214 can be removed from different locations of the unit cell geometry 252.

Figure 18:
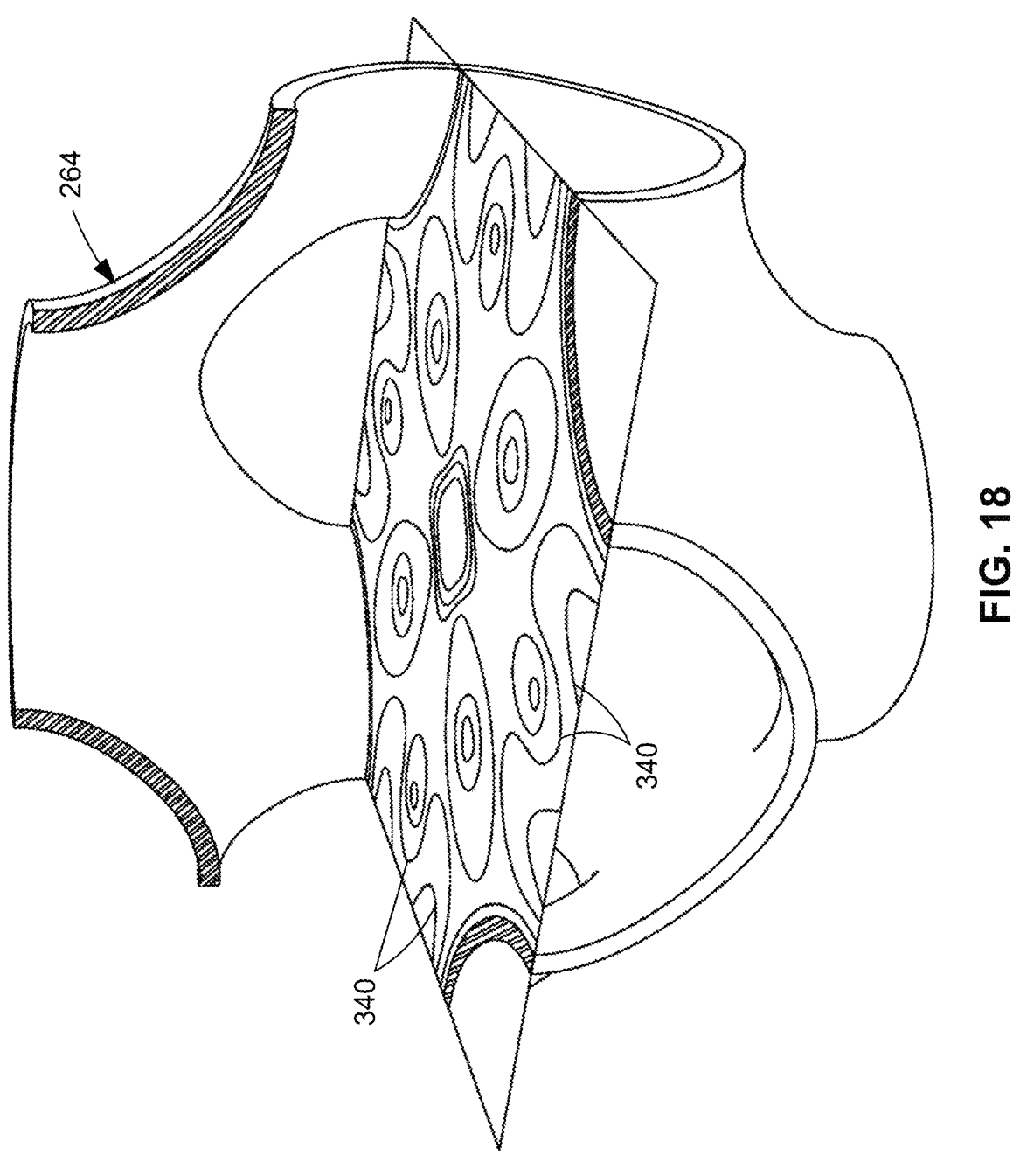
FIG. 18 shows contours of equal point average particle migration ratios on a slice of a sampling volume, which is superimposed on a cutaway view of a Schwarz-P configuration of the unit cell.

Referring to FIG. 18, shown is a contour-based visualization of the point average particle migration ratios of a sampling volume, according to step 103. More specifically, shown are contour lines 340 of equal point average particle migration ratios on a slice of a sampling volume, which is superimposed on a cutaway view of a Schwarz-P 264 configuration of the unit cell.

In FIG. 12-15, step 104 of the method 100 comprises calculating an average of the point average particle migration ratios respectively of the plurality of starting points 322 to give a global average particle migration ratio for the infill geometry 210. The method 100 can include calculating the global average particle migration ratios respectively of a plurality of different unit cell geometries 252, and comparing the global average particle migration ratios as a measure of the ability to remove powder 214 from the different unit cell geometries 252. The above-mentioned step 103 of the method 100 can include generating a histogram plot 400 (FIG. 19) containing the distributions of the point average particle migration ratios of each of the infill geometries having different unit cell geometries 252.

FIG. 19 shows an example of a histogram plot 400 of the point average particle migration ratios of the unit cell geometries 252 illustrated in FIGS. 20-24. Histogram plot 400 includes histogram 462 of cubic frame 262 (FIG. 20), histogram 454 of connectable cuboid 254 (FIG. 21), histogram 464 of Schwarz-P 264 (FIG. 22), histogram 466 of gyroid 266 (FIG. 23), and histogram 468 of body-centered-cubic 268 (FIG. 24) configurations. The histogram plot 400 of each unit cell geometry 252 (FIGS. 20-24) plots the distribution of the point average particle migration ratios, represented by the symbol $\lambda$, for the different starting points 322 within the enclosing volume 334. The minimum possible value for the point average particle migration ratio $\lambda$ is 1 as shown on the lefthand side of the histogram plot 400, and which represents free space with no obstacles along the trajectories 328 of the powder 214 particles 216 from the starting point 322 until exiting the enclosing volume 334. The maximum possible value for the point average particle migration ratio $\lambda$ is infinity (not shown) which means that powder 214 particles 216 are trapped and are unable to be removed. Note that due to the starting point directional trajectory length being bounded in practice, the upper limit will be prescribed by this upper bound. In FIG. 19, the values of the point average particle migration ratio increase from left to right.

Of the different unit cell geometries 252 illustrated in FIGS. 20-24, the cubic frame 262 has the lowest point average particle migration ratios $\lambda$, indicating that powder removability from an additively manufactured article 200 comprised of cubic frame 262 unit cells 250 may be easier than from an article 200 comprised of one of the other unit cell geometries 252 in FIGS. 20-24. The gyroid 266 and body-centered-cubic 268 have a relatively large quantity of starting points 322 that have relatively high point average particle migration ratios $\lambda$, indicating that powder removability may be more difficult from an article 200 comprised of these unit cells than from an article 200 comprised of one of the other unit cell geometries 252 of FIGS. 20-24. As can be seen, the histogram plot 400 provides a means for comparing differences in powder removability among different unit cell geometries 252 under consideration for use in an article 200 to be additively manufactured, and can thereby facilitate the selection of which unit cell geometry 252 to use for the infill geometry 210. Although the histogram plot 400 is described in the context of the unit cell geometries 252 of FIGS. 20-24, the histogram plot 400 can be implemented for any one of a variety of alternative unit cell geometries 252. Furthermore, a histogram plot 400 can be implemented for general part geometries, and is not limited to infill-driven parts.

Figure 25:
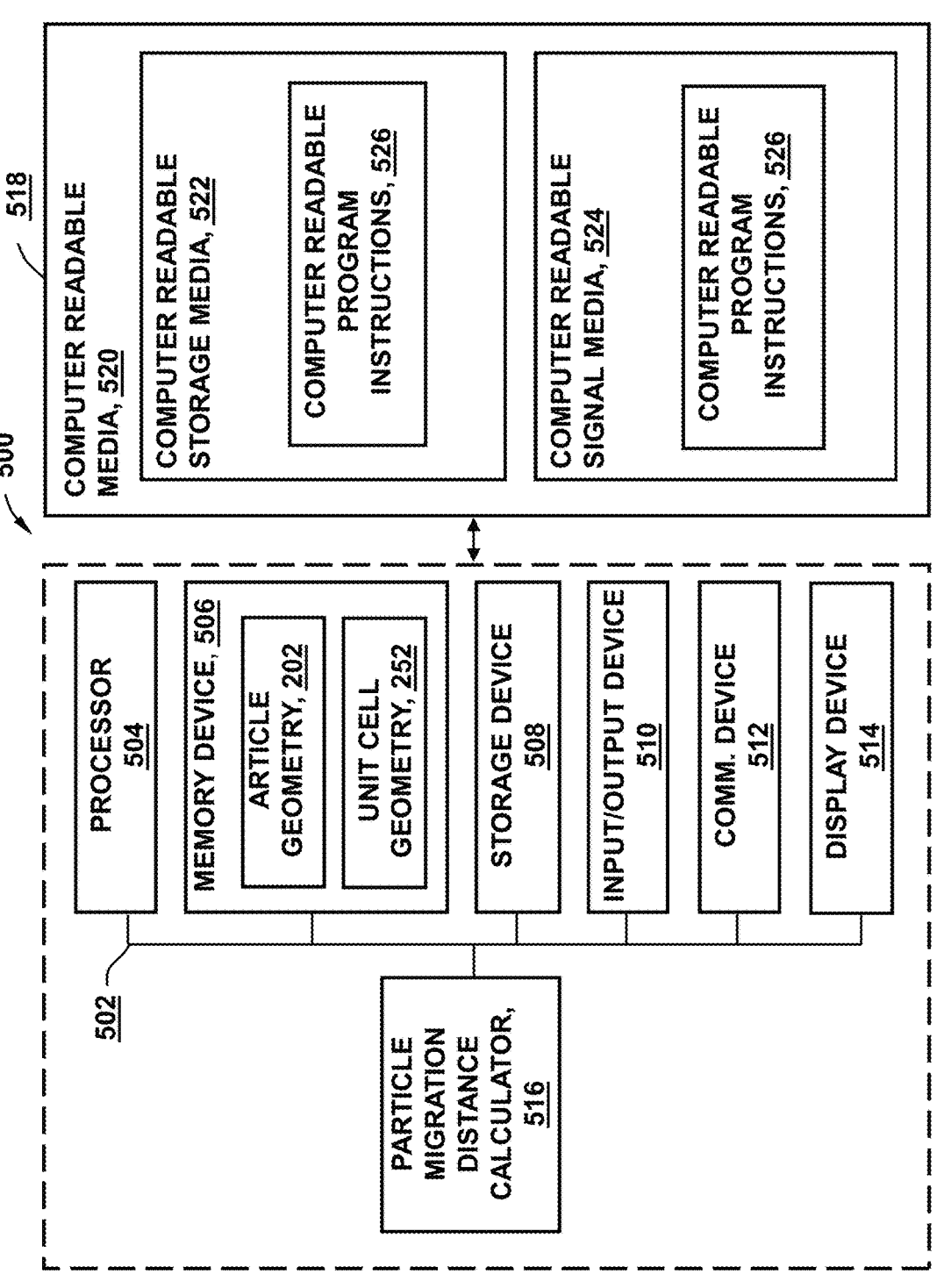
FIG. 25 is a block diagram of a processor-based system for implementing the method for assessing the ability to remove powder from an additively manufacturable article.

Referring now to FIG. 25, the above-described method 100, in whole or in part, may be performed in a computer-implemented process, such as on a processor-based system 500 or other suitable computer system. The processor-based system 500 is configured to perform computer readable program instructions 526. The computer readable program instructions 526 are provided to, or are loaded onto, the processor-based system 500 in order to implement any one or more of the above-described operations or steps of method 100. In a non-limiting example, the processor-based system 500 and/or the computer readable program instructions 526 facilitate assessment of the ability to remove powder 214 from an additively manufacturable article 200.

The block diagram of FIG. 25 includes a data communication path 502 (e.g., a data link) to communicatively couple one or more components, to facilitate transfer of data between such components. The communication path 502 comprises one or more data buses, or any other suitable communication path 502 that facilitates the transfer of data between the components and devices of the processor-based system 500. In a non-limiting example, the components include one or more of a processor 504, a memory device 506, a storage device 508, an input/output device 510, a communications device 512, a display device 514, and a particle migration distance calculator 516.

The memory device 506 is configured to store one or more article geometries 202. For example, the memory device 506 can store any one of a variety of sandwich panel 206 configurations, including a planar sandwich panel 206 (e.g., FIGS. 2-6) or other sandwich panel 206 configurations including non-planar sandwich panel 206s, variable-thickness sandwich panel 206s, sandwich panels 206 having a single layer 272 of unit cells 250, and sandwich panels 206 having two or more layers 272 of unit cells 250. The memory device 506 can also store any one of a variety of other three-dimensional objects of any shape, size, or configuration including three-dimensional objects having a single face sheet 208, or three-dimensional objects that are devoid of face sheets 208. In addition to storing article geometries 202, the memory device 506 is configured to store one or more unit cell geometries 252. For example, the memory device can store the above-mentioned cubic frame 262 (FIG. 20), connectable cuboid 254 (FIG. 21), Schwarz-P 264 (FIG. 22), gyroid 266 (FIG. 23), and body-centered-cubic 268 (FIG. 24) unit cell geometries 252.

Referring still to FIG. 25, the processor-based system 500 includes a particle migration distance calculator 516 configured to perform the following above-described operations for each of a plurality of discrete starting points 322 distributed within a sampling volume 320. For example, the particle migration distance calculator 516 calculates a plurality of starting point directional trajectory lengths respectively of a plurality of trajectories 328 of a particle 216 starting from the starting point 322 and moving in an initial direction 324 respectively along a plurality of combinations of a polar angle $\phi$ and an azimuthal angle $\theta$ of a spherical coordinate system 326 centered on the starting point 322, as described above for step 102A of the method 100. As noted above, each of the starting point directional trajectory lengths ends where the particle 216 exits a bounding surface 336 of an enclosing volume 334, and the trajectories 328 include reflections of the particle 216 off one or more geometry surfaces 204 defined by the article geometry 202 within the enclosing volume 334. The particle migration distance calculator 516 also calculates an average of the starting point directional trajectory lengths to give a starting point average trajectory length for the starting point 322, as described above for step 102B of the method 100. The particle migration distance calculator 516 calculates an average of the starting point average trajectory lengths respectively of the plurality of starting points 322 to give a global average trajectory length for the article 200.

The particle migration distance calculator 516 can calculate the starting point average trajectory length by analytically evaluating a definite integral of the plurality of starting point directional trajectory lengths across a space defined by all possible combinations of the polar angle $\phi$ and the azimuthal angle $\theta$. Alternatively, the particle migration distance calculator 516 can calculate the starting point average trajectory length by estimating a value of the definite integral of the plurality of starting point directional trajectory lengths across the space defined by all possible combinations of the polar angle $\phi$ and the azimuthal angle $\theta$ using numerical integration technique over the space, wherein the numerical integration technique comprises computing a Riemann sum, performing gauss point integration, using a trapezoidal rule, or using Simpson's rule. In a still further example, the particle migration distance calculator 516 can calculate the starting point average trajectory length by estimating the value of the definite integral of the plurality of starting point directional trajectory lengths across the space defined by all possible combinations of the polar angle $\phi$ and the azimuthal angle $\theta$ using a Monte Carlo technique.

The particle migration distance calculator 516 can calculate the global average trajectory length using any one of the techniques described above for the method 100. For example, the particle migration distance calculator 516 can calculate the global average trajectory length by analytically evaluating a definite integral across a domain defined by a set of all starting points 322 contained within the sampling volume 320, minus the set of all starting points 322 contained within the article geometry 202. Alternatively, the particle migration distance calculator 516 can calculate the global average trajectory length by estimating the value of the definite integral across the domain defined by the set of all starting points 322 contained within the sampling volume 320, minus the set of all starting points 322 contained within the article geometry 202, by discretization of the domain into elements shaped as tetrahedrons (i.e., tetrahedral elements 274), and subsequent integration across the tetrahedrons using basis functions. In another example, the particle migration distance calculator 516 can calculate the global average trajectory length by estimating the value of the definite integral across the domain defined by the set of all starting points 322 contained within the sampling volume 320, minus the set of all starting points 322 contained within the article geometry 202, using a Monte Carlo technique.

The particle migration distance calculator 516 can calculate the point average particle migration ratios of each of a plurality of article geometries 202 using the above-described operations of method 100. The particle migration distance calculator 516 can generate a histogram plot 400 of the point average particle migration ratios of each of the article geometries 202, similar to the above-described histogram plot 400 of FIG. 19. In addition, the particle migration distance calculator 516 can generate a visual representation of the unit cell geometry 252 and/or the article geometry 202 showing the starting points 322 and the corresponding point average particle migration ratios associated with each starting point 322 similar to the above-described FIG. 16 which shows starting points 322 coded (e.g., shaded and cross-hatched) in a manner representing the relative value of the point average particle migration ratios, or FIG. 18 which shows contours of equal point average particle migration ratios on a slice of a sampling volume.

Figure 26:
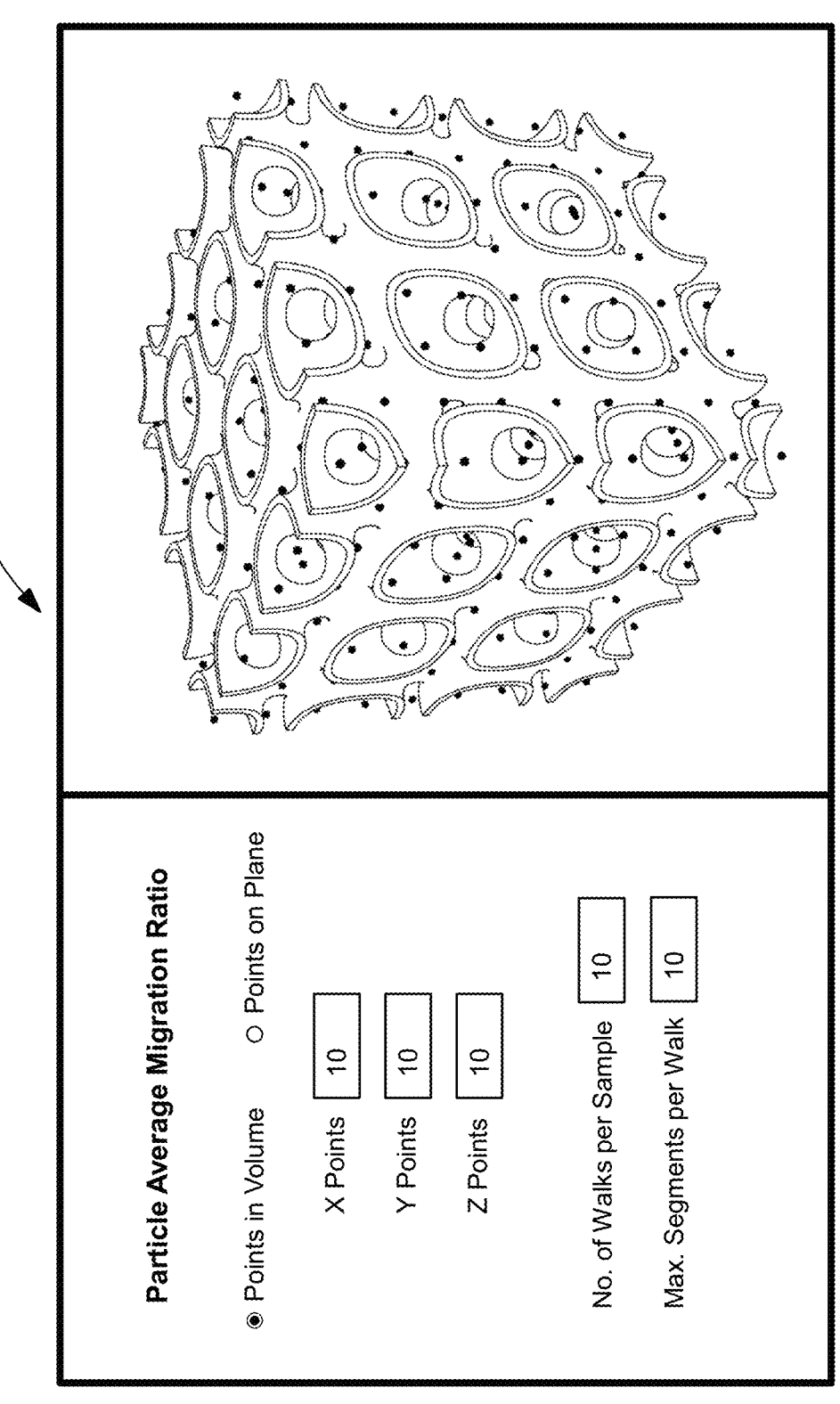
FIG. 26 shows an example of a user interface for the processor-based system of FIG. 25.

FIG. 26 shows a non-limiting example of a user interface 528 of the processor-based system 500 which exemplifies a Monte Carlo approach to computing the global average in step 104 of FIG. 1. The user interface 528 provides the ability to select a unit cell geometry 252 from among a plurality of different unit cell geometries 252 stored in the memory. The user interface 528 also provides the ability to display starting points 322 distributed within a volume or to display starting points 322 distributed within a plane by selecting a radio button to indicate the choice. The density of the starting points 322 in the x-direction ("X Points"), y-direction ("Y Points") and, if "Points in Volume" is selected, z-direction ("Z Points") may be entered by the user. Furthermore, the user interface 528 provides the ability to select the "Number of Walks per Sample" and the "Maximum Segments per Walk." The "Number of Walks per Sample" refers to the number of randomly selected pairs of angles (i.e., polar angle $\phi$ and azimuthal angle $\theta$) that are used to estimate the starting point average trajectory length. The starting point directional trajectory lengths are summed, and divided by the number of selected pairs of angles in order to estimate the starting point average trajectory length. The "Maximum Segments per Walk" refers to the cut off of the number of trajectory segments and is an upper bound in the event that a particle bounces forever between walls (e.g., of the infill geometry). A higher "Number of Walks per Sample" results in a better approximation of the average values. The "Maximum Segments per Walk" impacts cases where there is entrapment of a particle in an infinite loop, such that if "Maximum Segments per Walk" is too high, it would cause the average result to become less accurate.

The display device 514 is optionally employed to graphically display any one of the one of the unit cell geometries 252 stored in the memory device 506. In addition, the display device 514 is configured to graphically display a unit cell geometry 252 and the point average particle migration ratio associated with each starting point 322 similar to the above-described FIG. 16. Additionally, the display device 514 is configured to graphically display a histogram plot 400 of the point average particle migration ratios of each of the unit cell geometries 252, similar to the above-described histogram plot 400 of FIG. 19. The display device 514 receives the above-noted data from one or more of the corresponding components of the processor-based system 500 via the communication path 502.

The processor-based system 500 includes the processor 504 for executing instructions of computer readable program instructions 526 installed in the memory device 506. Alternatively, the processor-based system 500 comprises a multiprocessor core having two or more integrated processor cores. Even further, the processor 504 may comprise a main processor and one or more secondary processors integrated on a chip. The processor 504 may also comprise a multiprocessor system having a plurality of similarly configured processors.

Referring still to FIG. 25, the memory device 506 may comprise one or more volatile or non-volatile storage devices 508. However, the memory device 506 can comprise any hardware device for storing data. For example, the memory device 506 can comprise a random-access memory or a cache of a device interface and/or integrated memory controller hub included in the communication path 502. The memory device 506 can permanently and/or temporarily store any one of a variety of different types of data, computer readable code or program instructions, or any other type of information. The storage device 508 can be provided in a variety of configurations including, but not limited to, a flash memory device, a hard drive, an optical disk, a hard disk, a magnetic tape or any other suitable example for long-term storage. In addition, the storage device 508 can comprise a removable device such as a removable hard drive.

The processor-based system 500 can additionally include one or more of the input/output devices 510 to facilitate the transfer of data between components connected to the processor-based system 500. An input/output device 510 can be directly and/or indirectly coupled to the processor-based system 500. The input/output device 510 facilitates user-input by means of a peripheral device such as a keyboard, a mouse, a joystick, a touch screen, and any other suitable device for inputting data to the processor-based system 500. The input/output device 510 can further include an output device for transferring data representative of the output of the processor-based system 500. For example the input/output device 510 can comprise a display device 514 configured as a computer monitor or computer screen for displaying results of data processed by the processor-based system 500. The input/output device 510 can optionally include a printer or fax machine for printing a hardcopy of information processed by the processor-based system 500.

Referring still to FIG. 25, the processor-based system 500 can include one or more communications devices 512 to facilitate communication of the processor-based system 500 within a computer network and/or with other processor-based systems. Communication of the processor-based system 500 with a computer network or with other processor-based systems can be by wireless means and/or by hardwire connection. For example, the communications device 512 can comprise a network interface controller to enable wireless or cable communication between the processor-based system 500 and a computer network. The communications device 512 can also comprise a modem and/or a network adapter, or any one of a variety of alternative devices for transmitting and receiving data.

One or more of the operations of the above-described method 100 are performed by the processor 504 and/or by one or more of the particle migration distance calculator 516, using the computer readable program instructions 526. The computer readable program instructions 526 can comprise program code, which can include computer usable program code and computer readable program code. The computer readable program instructions 526 are read and executed by the processor 504. The computer readable program instructions 526 enable the processor 504 to perform one or more operations of the above-described examples associated with assessing the ability to remove powder 214 from an additively manufacturable article 200.

Referring still to FIG. 25, the computer readable program instructions 526 include operating instructions for the processor-based system 500, and further include applications and programs. The computer readable program instructions 526 can be contained within and/or loaded onto one or more of a memory device 506 and/or a storage device 508 for execution by the processor 504 and/or by the particle migration distance calculator 516. As indicated above, the memory device 506 and/or storage device 508 can be communicatively coupled to one or more of the components illustrated in FIG. 24 through the communication path 502.

The computer readable program instructions 526 can be contained on tangible or non-tangible, transitory or non-transitory computer readable media 520 and which can be loaded onto or transferred to the processor-based system 500 for execution by the processor 504. The computer readable program instructions 526 and the computer readable media 520 comprise a computer program product 518. In an example, the computer readable media 520 can comprise computer readable storage media 522 and/or computer readable signal media 524.

The computer readable storage media 522 can comprise a variety of different examples including, but not limited to, optical disks and magnetic disks that may be loaded into a drive, a flash memory device, or other storage device or hardware for transfer of data onto a storage device such as a hard drive. The computer readable storage media 522 can be non-removably installed on the processor-based system 500. The computer readable storage media 522 can comprise any suitable storage media including, without limitation, a semiconductor system or a propagation medium. In this regard, the computer readable storage media 522 can comprise electronic media, magnetic media, optical media, electromagnetic media, and infrared media. For example, the computer readable storage media 522 can comprise magnetic tape, a computer diskette, random access memory, and read-only memory. Non-limiting examples of optical disks include compact disks—read only memory, compact disks—read/write, and digital video disks (i.e., digital versatile disks).

The computer readable signal media 524 can contain the computer readable program instructions 526, and can be provided in a variety of data signal configurations including, but not limited to, an electromagnetic signal and an optical signal. Such data signals can be transmitted by any suitable communications link including by wireless or hardwire means. For example, the hardwire means may comprise an optical fiber cable, a coaxial cable, a signal wire, and any other suitable means for transmitting the data by wireless or by physical means.

Referring still to FIG. 25, the computer readable signal media 524 can facilitate the downloading of the computer readable program instructions 526 to the non-volatile storage or other suitable storage or memory device for use within processor-based system 500. For example, the computer readable program instructions 526 contained within the computer readable storage media 522 can be downloaded to the processor-based system 500 over a computer network from a server or a client computer of another system.

Any one of a variety of different examples of the processor-based system 500 can be implemented using any hardware device or system capable of executing the computer readable program instructions 526. For example, the processor 504 can comprise a hardware unit configured for performing one or more particular functions wherein the computer readable program instructions 526 for performing the functions are pre-loaded into the memory device 506.

In an example, the processor 504 can comprise an application specific integrated circuit, a programmable logic device, or any other hardware device configured to perform one or more specific functions or operations. For example, a programmable logic device may be temporarily or permanently programmed to perform one or more of the operations related to assessing the ability to remove powder 214 from an additively manufacturable article 200. The programmable logic device can comprise a programmable logic array, programmable array logic, a field programmable logic array, and a field programmable gate array and any other suitable logic device, without limitation. In an example, the computer readable program instructions 526 can be operated by the processor 504 and/or by other devices, including one or more hardware units in communication with the processor 504. Certain portions of the computer readable program instructions 526 can be run by the one or more hardware units.

The disclosure includes example embodiments in accordance with the following clauses:

Clause 1. A method of assessing the ability to remove powder (214) from an additively manufacturable article (200), comprising:

performing the following for each of a plurality of discrete starting points (322) distributed within a sampling volume (320):

calculating a plurality of starting point directional trajectory lengths respectively of a plurality of trajectories (328) of a particle (216) starting from the starting point (322) and moving in an initial direction (324) respectively along a plurality of combinations of a polar angle φ and an azimuthal angle θ of a spherical coordinate system (326) about the starting point (322), and each of the starting point directional trajectory lengths ends where the particle (216) exits a bounding surface (336) of an enclosing volume (334), wherein the trajectories (328) include reflections of the particle (216) off one or more geometry surfaces (204) defined by an article geometry (202) within the enclosing volume (334);

calculating an average of the starting point directional trajectory lengths to give a starting point average trajectory length for the starting point (322); and calculating an average of the starting point average trajectory lengths respectively of the plurality of starting points (322) to give a global average trajectory length for the article (200).

Clause 2. The method of Clause 1, wherein the sampling volume (320) and the enclosing volume (334) are the same region, which is the region bounded by outer faces (213) of the article (200).

Clause 3. The method of any of Clauses 1-2, wherein:

at least one of the starting point directional trajectory lengths is comprised of a plurality of trajectory segments (330) resulting from the reflection of the particle (216) off the one or more geometry surfaces (204); and the step of calculating each starting point directional trajectory length for a given starting point (322), polar angle and azimuthal angle comprises summing up the lengths of the plurality of trajectory segments (330).

Clause 4. The method of any of Clauses 1-3, wherein the step of calculating the starting point average trajectory length comprises one of the following:

analytically evaluating a definite integral of the plurality of starting point directional trajectory lengths across a space defined by all possible combinations of the polar angle φ and the azimuthal angle θ;

estimating a value of the definite integral of the plurality of starting point directional trajectory lengths across the space defined by all possible combinations of the polar angle φ and the azimuthal angle θ using a numerical integration technique over the space, the numerical integration technique comprising one of the following:

computing a Riemann sum, performing gauss point integration, using a trapezoidal rule, using Simpson's rule; or estimating the value of the definite integral of the plurality of starting point directional trajectory lengths across the space defined by all possible combinations of the polar angle φ and the azimuthal angle θ using a Monte Carlo technique.

Clause 5. The method of any of Clauses 1-4, wherein the step of calculating the global average trajectory length comprises one of the following:

analytically evaluating a definite integral across a domain defined by a set of all starting points (322) contained within the sampling volume (320), minus the set of all starting points (322) contained within the article geometry (202);

estimating the value of the definite integral across the domain defined by the set of all starting points (322) contained within the sampling volume (320), minus the set of all starting points (322) contained within the article geometry (202), by discretization of the domain into elements shaped as tetrahedrons, and subsequent integration across the tetrahedrons using basis functions; or estimating the value of the definite integral across the domain defined by the set of all starting points (322) contained within the sampling volume (320), minus the set of all starting points (322) contained within the article geometry (202), using a Monte Carlo technique.

Clause 6. The method of any of Clauses 1-5, wherein:

the article geometry (202) comprises a single unit cell (250) of a periodic unit cell pattern used in an additively manufacturable article (200);

the starting point directional trajectory lengths for a given starting point (322) are normalized by a prescribed distance so as to define a directional point migration ratio;

the starting point average trajectory lengths are normalized by the prescribed distance so as to define a point average particle migration ratio; and the global average trajectory lengths are normalized by the prescribed distance so as to define a global average particle migration ratio.

Clause 7. The method of Clause 6 wherein:

the unit cell (250) has a cell side length (270);

the sampling volume (320) is a cube (300) having cube side lengths (302) equal to the cell side length (270);

the enclosing volume (334) is a sphere (338), the location of which shifts for each starting point (322), such that the sphere (338) is centered about each starting point (322) when calculating the starting point directional trajectory lengths associated with the starting point (322);

the sphere (338) has a radius equal to the product of the cell side length (270) and the square root of three; and the prescribed distance by which all starting point directional trajectory lengths are normalized is the radius of the sphere (338).

Clause 8. The method of any of Clauses 6-7, further comprising:

comparing the global average particle migration ratios respectively of a plurality of different periodic unit cell geometries (252), as a measure of the ability to remove powder (214) from the different periodic unit cell geometries (252).

Clause 9. The method of any of Clauses 6-8, further comprising:

calculating the global average particle migration ratios respectively of a plurality of different unit cell geometries (252); and generating a histogram plot (400) containing the histograms of the global average particle migration ratio for each of the unit cell geometries (252).

Clause 10. The method of any of Clauses 6-9, further comprising:

displaying at least a subset of the plurality of starting points (322) in a manner such that each starting point (322) has a color that corresponds to a unique value of the point average particle migration ratio of the starting point (322), to thereby illustrate a spatial variation in the point average particle migration ratio across the enclosing volume (334), or a subset thereof.

Clause 11. A method of assessing the ability to remove powder from an infill geometry of an additively manufacturable article, comprising:

performing the following for each of a plurality of discrete starting points (322) distributed within one of a plurality of interconnected unit cells (250) that form the infill geometry (210) of the article (200), the unit cells (250) having a common unit cell geometry (252) and each unit cell (250) fits exactly within a cube (300) having a body diagonal (306):

calculating a plurality of starting point directional trajectory lengths respectively of a plurality of trajectories (328) of a particle (216) starting from the starting point (322) and moving in an initial direction (324) respectively along a plurality of combinations of a polar angle φ and an azimuthal angle θ of a spherical coordinate system (326) about the starting point (322), and each of the starting point directional trajectory lengths ends where the particle (216) exits a sphere (338) within the infill geometry (210), the sphere (338) encompasses the unit cell (250) that contains the plurality of starting points (322) and has a radius equivalent to the length of the body diagonal (306), wherein the trajectories (328) include reflections of the particle (216) off one or more geometry surfaces (204) defined by the infill geometry (210);

calculating an average of the starting point directional trajectory lengths for the starting point (322), and dividing the average by the body diagonal (306) to give a point average particle migration ratio for the starting point (322); and calculating an average of the point average particle migration ratios respectively of the plurality of starting points (322) to give a global average particle migration ratio for the infill geometry (210).

Clause 12. The method of Clause 11, wherein:

at least one of the starting point directional trajectory lengths is comprised of a plurality of trajectory segments (330) resulting from the reflection of the particle (216) off the one or more geometry surfaces (204); and the step of calculating each starting point directional trajectory length for a given starting point (322), polar angle and azimuthal angle comprises summing up the lengths of the plurality of trajectory segments (330).

Clause 13. The method of any of Clauses 11-12, wherein the step of calculating the plurality of starting point directional trajectory lengths comprises one of the following:

analytically evaluating a definite integral of the plurality of starting point directional trajectory lengths across a space defined by all possible combinations of the polar angle $\phi$ and the azimuthal angle $\theta$;

estimating a value of the definite integral of the plurality of starting point directional trajectory lengths across a space defined by all possible combinations of the polar angle $\phi$ and the azimuthal angle $\theta$ using a numerical integration technique over the space, the numerical integration technique comprising one of the following: computing a Riemann sum, performing gauss point integration, using a trapezoidal rule, using Simpson's rule; or estimating the value of the definite integral of the plurality of starting point directional trajectory lengths across a space defined by all possible combinations of the polar angle $\phi$ and the azimuthal angle $\theta$ using a Monte Carlo technique.

Clause 14. The method of any of Clauses 11-13, wherein calculating the global average particle migration ratio comprises:

calculating a plurality of global average particle migration ratios respectively of a plurality of different infill geometries (210), using one of the following techniques for each infill geometry (210):

analytically evaluating the average of the point average particle migration ratios across a domain defined by a set of all starting points (322) contained within the cube (300), minus the set of all starting points (322) contained within the infill geometry (210);

estimating a value of the average of the point average particle migration ratio across a domain defined by the set of all starting points (322) contained within the cube (300), minus the set of all starting points (322) contained within the infill geometry (210), by discretization of the domain into elements shaped as tetrahedrons, and subsequent integration across the tetrahedrons using basis function; and estimating the value of the average of the point average particle migration ratio across the domain defined by the set of all starting points (322) contained within the cube (300), minus the set of all starting points (322) contained within the infill geometry (210), using a Monte Carlo technique.

Clause 15. The method of any of Clauses 11-14, wherein the unit cell geometry (252) has one of the following configurations: connectable cuboid (254), Schwarz-P (264), gyroid (266), or body-centered-cubic (268).

Clause 16. A processor-based system for assessing the ability to remove powder from an additively manufacturable article, comprising:

a memory device (506) configured to store an article geometry (202) of the article (200) comprised of a plurality of interconnected unit cells (250) each fitting exactly within a cube (300) and having a common unit cell geometry (252);

a particle migration distance calculator (516) configured to perform the following for each of a plurality of discrete starting points (322) distributed within a sampling volume (320):

calculating a plurality of starting point directional trajectory lengths respectively of a plurality of trajectories (328) of a particle (216) starting from the starting point (322) and moving in an initial direction (324) respectively along a plurality of combinations of a polar angle $\phi$ and an azimuthal angle $\theta$ of a spherical coordinate system (326) about the starting point (322), and each of the starting point directional trajectory lengths ends where the particle (216) exits a bounding surface (336) of an enclosing volume (334), wherein the trajectories (328) include reflections of the particle (216) off one or more geometry surfaces (204) defined by the article geometry (202) within the enclosing volume (334);

calculating an average of the starting point directional trajectory lengths to give a starting point average trajectory length for the starting point (322); and the particle migration distance calculator (516) configured to calculate an average of the starting point average trajectory lengths respectively of the plurality of starting points (322) to give a global average trajectory length for the article (200).

Clause 17. The processor-based system of Clause 16, wherein the particle migration distance calculator is configured to calculate the starting point average trajectory length by performing one of the following:

analytically evaluating a definite integral of the plurality of starting point directional trajectory lengths across a space defined by all possible combinations of the polar angle $\phi$ and the azimuthal angle $\theta$;

estimating a value of the definite integral of the plurality of starting point directional trajectory lengths across the space defined by all possible combinations of the polar angle $\phi$ and the azimuthal angle $\theta$ using a numerical integration technique over the space, the numerical integration technique comprising one of the following: computing a Riemann sum, performing gauss point integration, using a trapezoidal rule, using Simpson's rule; or estimating the value of the definite integral of the plurality of starting point directional trajectory lengths across the space defined by all possible combinations of the polar angle $\phi$ and the azimuthal angle $\theta$ using a Monte Carlo technique.

Clause 18. The processor-based system of any of Clauses 16-17, wherein the particle migration distance calculator is configured to calculate the global average trajectory length using one of the following:

analytically evaluating a definite integral across a domain defined by a set of all starting points (322) contained within the sampling volume (320), minus the set of all starting points (322) contained within the article geometry (202);

estimating the value of the definite integral across the domain defined by set of all starting points (322) contained within the sampling volume (320), minus the set of all starting points (322) contained within the article geometry (202), by discretization of the domain into elements shaped as tetrahedrons, and subsequent integration across the tetrahedrons using basis function; or estimating the value of the definite integral across the domain defined by the set of all starting points (322) contained within the sampling volume (320), minus the set of all starting points (322) contained within the article geometry (202), using a Monte Carlo technique.

Clause 19. The processor-based system of any of Clauses 16-18, wherein:

the memory device (506) is configured to store a plurality different unit cell geometries (252) for a corresponding plurality of different article geometries (202) of the article (200);

the particle migration distance calculator (516) is configured to:

calculate the global average particle migration ratio of each of the plurality of article geometries (202); and generate a histogram containing the global average particle migration ratio of each of the article geometries (202).

Clause 20. The processor-based system of any of Clauses 16-19, wherein:

the particle migration distance calculator (516) is configured to generate a visual representation of the article geometry (202) illustrating the plurality of starting points (322) and indicating the corresponding point average particle migration ratio associated with each starting point (322).

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A method of assessing the ability to remove powder from an additively manufacturable article, comprising:

performing, for each of a plurality of different unit cell geometries, the following for each of a plurality of discrete starting points distributed within a sampling volume comprised of one or more interconnected unit cells that form an infill geometry of the article:

calculating a plurality of starting point directional trajectory lengths respectively of a plurality of trajectories of a particle starting from the starting point and moving in an initial direction respectively along a plurality of combinations of a polar angle $\phi$ and an azimuthal angle $\theta$ of a spherical coordinate system about the starting point, and each of the starting point directional trajectory lengths ends where the particle exits a bounding surface of an enclosing volume, wherein the trajectories include reflections of the particle off one or more geometry surfaces defined by an article geometry within the enclosing volume;

calculating an average of the starting point directional trajectory lengths to give a starting point average trajectory length for the starting point; and calculating, for each of the unit cell geometries, an average of the starting point average trajectory lengths respectively of the plurality of starting points to give a global average trajectory length for the article; and selecting, from among the plurality of different unit cell geometries, one of the unit cell geometries for use in the infill geometry of the article, based at least in part on the global average trajectory length determined for each of the plurality of unit cell geometries.

2. The method of claim 1, wherein the sampling volume and the enclosing volume are the same region, which is a region bounded by outer faces of the article.

3. The method of claim 1, wherein:

at least one of the starting point directional trajectory lengths is comprised of a plurality of trajectory segments resulting from the reflection of the particle off the one or more geometry surfaces; and the step of calculating each starting point directional trajectory length for a given starting point, polar angle and azimuthal angle comprises summing up the lengths of the plurality of trajectory segments.

4. The method of claim 1, wherein the step of calculating the starting point average trajectory length comprises one of the following:

analytically evaluating a definite integral of the plurality of starting point directional trajectory lengths across a space defined by all possible combinations of the polar angle $\phi$ and the azimuthal angle $\theta$;

estimating a value of the definite integral of the plurality of starting point directional trajectory lengths across the space defined by all possible combinations of the polar angle $\phi$ and the azimuthal angle $\theta$ using a numerical integration technique over the space, the numerical integration technique comprising one of the following: computing a Riemann sum, performing gauss point integration, using a trapezoidal rule, using Simpson's rule; or estimating the value of the definite integral of the plurality of starting point directional trajectory lengths across the space defined by all possible combinations of the polar angle $\phi$ and the azimuthal angle $\theta$ using a Monte Carlo technique.

5. The method of claim 1, wherein the step of calculating the global average trajectory length comprises one of the following:

analytically evaluating a definite integral across a domain defined by a set of all starting points contained within the sampling volume, minus the set of all starting points contained within the article geometry;

estimating a value of the definite integral across the domain defined by the set of all starting points contained within the sampling volume, minus the set of all starting points contained within the article geometry, by discretization of the domain into elements shaped as tetrahedrons, and subsequent integration across the tetrahedrons using basis functions; or estimating the value of the definite integral across the domain defined by the set of all starting points contained within the sampling volume, minus the set of all starting points contained within the article geometry, using a Monte Carlo technique.

6. The method of claim 1, wherein:

the article geometry comprises a single unit cell of a periodic unit cell pattern used in an additively manufacturable article;

the starting point directional trajectory lengths for a given starting point are normalized by a prescribed distance so as to define a directional point migration ratio;

the starting point average trajectory lengths are normalized by the prescribed distance so as to define a point average particle migration ratio; and the global average trajectory lengths are normalized by the prescribed distance so as to define a global average particle migration ratio.

7. The method of claim 6 wherein:

the unit cell has a cell side length;

the sampling volume is a cube having cube side lengths equal to the cell side length;

the enclosing volume is a sphere, the location of which shifts for each starting point, such that the sphere is centered about each starting point when calculating the starting point directional trajectory lengths associated with the starting point;

the sphere has a radius equal to the product of the cell side length and the square root of three; and the prescribed distance by which all starting point directional trajectory lengths are normalized is the radius of the sphere.

8. The method of claim 6, further comprising:

comparing the global average particle migration ratios respectively of a plurality of different periodic unit cell geometries, as a measure of the ability to remove powder from the different periodic unit cell geometries.

9. The method of claim 6, further comprising:

calculating the global average particle migration ratios respectively of a plurality of different unit cell geometries; and generating a histogram plot containing the histograms of the global average particle migration ratio for each of the unit cell geometries.

10. The method of claim 6, further comprising:

displaying at least a subset of the plurality of starting points in a manner such that each starting point has a color that corresponds to a unique value of the point average particle migration ratio of the starting point, to thereby illustrate a spatial variation in the point average particle migration ratio across the enclosing volume, or a subset thereof.

11. A method of assessing the ability to remove powder from an infill geometry of an additively manufacturable article, comprising:

performing, for each of a plurality of different unit cell geometries, the following for each of a plurality of discrete starting points distributed within one of a plurality of interconnected unit cells that form the infill geometry of the article, the unit cells having a common unit cell geometry and each unit cell fits exactly within a cube having a body diagonal:

calculating a plurality of starting point directional trajectory lengths respectively of a plurality of trajectories of a particle starting from the starting point and moving in an initial direction respectively along a plurality of combinations of a polar angle $\phi$ and an azimuthal angle $\theta$ of a spherical coordinate system about the starting point, and each of the starting point directional trajectory lengths ends where the particle exits a sphere within the infill geometry, the sphere encompasses the unit cell that contains the plurality of starting points and has a radius equivalent to the length of the body diagonal, wherein the trajectories include reflections of the particle off one or more geometry surfaces defined by the infill geometry;

calculating an average of the starting point directional trajectory lengths for the starting point, and dividing the average by the body diagonal to give a point average particle migration ratio for the starting point; and calculating, for each of the unit cell geometries, an average of the point average particle migration ratios respectively of the plurality of starting points to give a global average particle migration ratio for the infill geometry; and selecting, from among the plurality of different unit cell geometries, one of the unit cell geometries for use in the infill geometry of the article, based at least in part on the global average particle migration ratio determined for each of the plurality of unit cell geometries.

12. The method of claim 11, wherein:

at least one of the starting point directional trajectory lengths is comprised of a plurality of trajectory segments resulting from the reflection of the particle off the one or more geometry surfaces; and the step of calculating each starting point directional trajectory length for a given starting point, polar angle and azimuthal angle comprises summing up the lengths of the plurality of trajectory segments.

13. The method of claim 11, wherein the step of calculating the plurality of starting point directional trajectory lengths comprises one of the following:

analytically evaluating a definite integral of the plurality of starting point directional trajectory lengths across a space defined by all possible combinations of the polar angle $\phi$ and the azimuthal angle $\theta$;

estimating a value of the definite integral of the plurality of starting point directional trajectory lengths across a space defined by all possible combinations of the polar angle $\phi$ and the azimuthal angle $\theta$ using a numerical integration technique over the space, the numerical integration technique comprising one of the following: computing a Riemann sum, performing gauss point integration, using a trapezoidal rule, using Simpson's rule; or estimating the value of the definite integral of the plurality of starting point directional trajectory lengths across a space defined by all possible combinations of the polar angle $\phi$ and the azimuthal angle $\theta$ using a Monte Carlo technique.

14. The method of claim 11, wherein calculating the global average particle migration ratio comprises:

calculating a plurality of global average particle migration ratios respectively of a plurality of different infill geometries, using one of the following techniques for each infill geometry:

analytically evaluating the average of the point average particle migration ratios across a domain defined by a set of all starting points contained within the cube, minus the set of all starting points contained within the infill geometry;

estimating a value of the average of the point average particle migration ratio across a domain defined by the set of all starting points contained within the cube, minus the set of all starting points contained within the infill geometry, by discretization of the domain into elements shaped as tetrahedrons, and subsequent integration across the tetrahedrons using basis function; and estimating the value of the average of the point average particle migration ratio across the domain defined by the set of all starting points contained within the cube, minus the set of all starting points contained within the infill geometry, using a Monte Carlo technique.

15. The method of claim 11, wherein the unit cell geometry has one of the following configurations: connectable cuboid, Schwarz-P, gyroid, or body-centered-cubic.

16. A processor-based system for assessing the ability to remove powder from an additively manufacturable article, comprising:

a memory device configured to store an article geometry of the article and store a plurality different unit cell geometries, and the article geometry is comprised of a plurality of interconnected unit cells each fitting exactly within a cube and having a common unit cell geometry;

a user interface configured to receive a user selection of one of the plurality of different unit cell geometries stored in the memory;

a particle migration distance calculator configured to perform the following for each of a plurality of discrete starting points distributed within a sampling volume comprised of one or more interconnected unit cells having a unit cell geometry selected by the user:

calculating a plurality of starting point directional trajectory lengths respectively of a plurality of trajectories of a particle starting from the starting point and moving in an initial direction respectively along a plurality of combinations of a polar angle $\phi$ and an azimuthal angle $\theta$ of a spherical coordinate system about the starting point, and each of the starting point directional trajectory lengths ends where the particle exits a bounding surface of an enclosing volume, wherein the trajectories include reflections of the particle off one or more geometry surfaces defined by the article geometry within the enclosing volume;

calculating an average of the starting point directional trajectory lengths to give a starting point average trajectory length for the starting point; and the particle migration distance calculator configured to calculate, for the unit cell geometry selected by the user, an average of the starting point average trajectory lengths respectively of the plurality of starting points to give a global average trajectory length for the article.

17. The processor-based system of claim 16, wherein the particle migration distance calculator is configured to calculate the starting point average trajectory length by performing one of the following:

analytically evaluating a definite integral of the plurality of starting point directional trajectory lengths across a space defined by all possible combinations of the polar angle $\phi$ and the azimuthal angle $\theta$;

estimating a value of the definite integral of the plurality of starting point directional trajectory lengths across the space defined by all possible combinations of the polar angle $\phi$ and the azimuthal angle $\theta$ using a numerical integration technique over the space, the numerical integration technique comprising one of the following:

computing a Riemann sum, performing gauss point integration, using a trapezoidal rule, using Simpson's rule; or estimating the value of the definite integral of the plurality of starting point directional trajectory lengths across the space defined by all possible combinations of the polar angle $\phi$ and the azimuthal angle $\theta$ using a Monte Carlo technique.

18. The processor-based system of claim 16, wherein the particle migration distance calculator is configured to calculate the global average trajectory length using one of the following:

analytically evaluating a definite integral across a domain defined by a set of all starting points contained within the sampling volume, minus the set of all starting points contained within the article geometry;

estimating a value of the definite integral across the domain defined by set of all starting points contained within the sampling volume, minus the set of all starting points contained within the article geometry, by discretization of the domain into elements shaped as tetrahedrons, and subsequent integration across the tetrahedrons using basis function; or estimating the value of the definite integral across the domain defined by the set of all starting points contained within the sampling volume, minus the set of all starting points contained within the article geometry, using a Monte Carlo technique.

19. The processor-based system of claim 16, wherein:

the memory device is configured to store a plurality of different article geometries of the article;

the particle migration distance calculator is configured to:

calculate a global average particle migration ratio of each of the plurality of article geometries; and generate a histogram containing the global average particle migration ratio of each of the article geometries.

20. The processor-based system of claim 16, wherein:

the particle migration distance calculator is configured to generate a visual representation of the article geometry illustrating the plurality of starting points and indicating the corresponding point average particle migration ratio associated with each starting point.

* * * * *